(12) United States Patent
Zheng et al.

(10) Patent No.: US 9,185,689 B2
(45) Date of Patent: Nov. 10, 2015

(54) APPARATUS AND METHOD FOR RESOURCE ALLOCATION IN WIRELESS COMMUNICATIONS

(75) Inventors: Yan-Xiu Zheng, Shulin (TW); Chang-Lan Tsai, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 857 days.

(21) Appl. No.: 13/014,146

(22) Filed: Jan. 26, 2011

(65) Prior Publication Data

US 2011/0195733 A1  Aug. 11, 2011

Related U.S. Application Data

(60) Provisional application No. 61/302,706, filed on Feb. 9, 2010.

(51) Int. Cl.
*H04W 72/04* (2009.01)
*H04L 5/00* (2006.01)

(52) U.S. Cl.
CPC ........... *H04W 72/042* (2013.01); *H04L 5/0094* (2013.01); *H04L 5/0041* (2013.01); *H04W 72/0453* (2013.01)

(58) Field of Classification Search
CPC ................. H04W 72/0453; H04B 7/0413
See application file for complete search history.

(56) References Cited

U.S. PATENT DOCUMENTS

| | | | | |
|---|---|---|---|---|
| 7,944,877 B2 * | 5/2011 | Jung et al. | ...... | 370/329 |
| 2007/0259635 A1 * | 11/2007 | Oh et al. | ...... | 455/186.1 |
| 2008/0130570 A1 * | 6/2008 | Jung et al. | ...... | 370/330 |
| 2012/0120903 A1 * | 5/2012 | Kim et al. | ...... | 370/329 |
| 2012/0281641 A1 * | 11/2012 | Cui et al. | ...... | 370/329 |
| 2013/0142154 A1 * | 6/2013 | Gorokhov et al. | ...... | 370/329 |

* cited by examiner

*Primary Examiner* — Bobbak Safaipour
(74) *Attorney, Agent, or Firm* — Finnegan, Henderson, Farabow, Garrett & Dunner LLP

(57) ABSTRACT

A method for a base station to allocate resources to a mobile station, the resources being included in one or more subbands each including a plurality of resource units, the method including: allocating a part of a first one of the subbands to the mobile station, the part including one or more resource units in the first one of the subbands; and indicating to the mobile station the allocated part of the first one of the subbands by indicating a resource allocation pattern corresponding to the allocated part of the first one of the subbands.

39 Claims, 21 Drawing Sheets

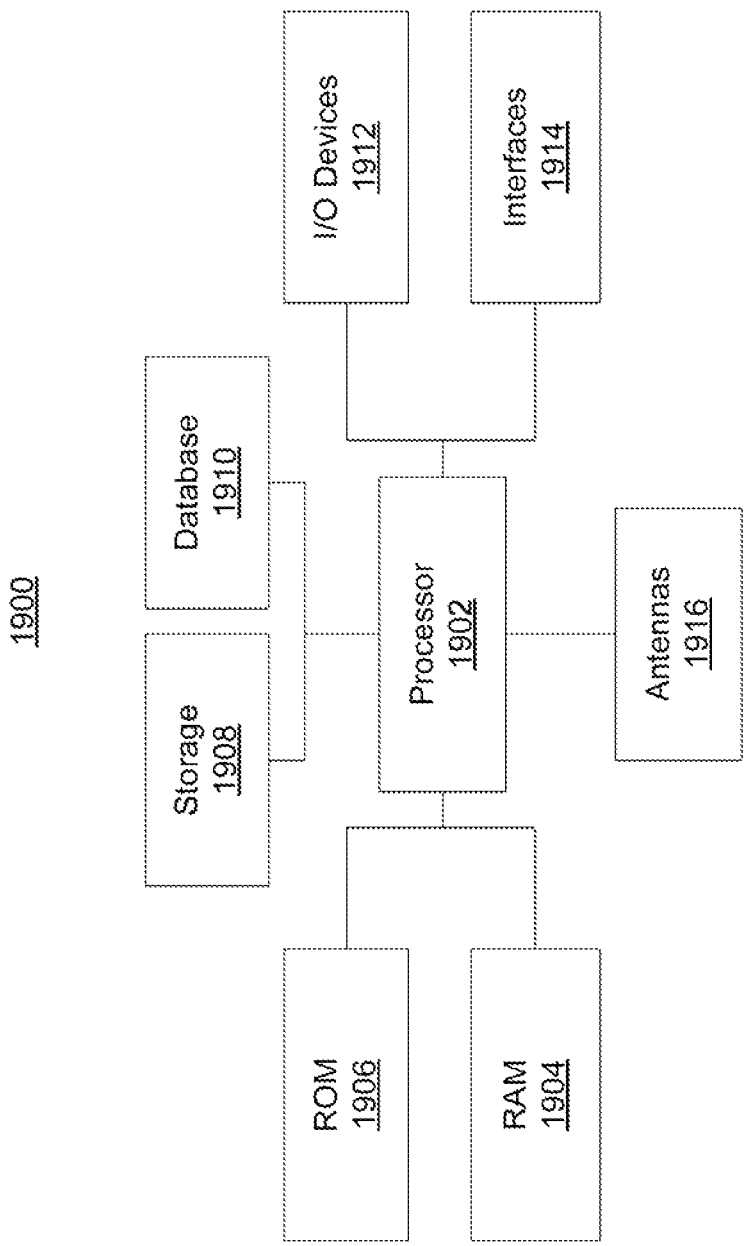

APPARATUS AND METHOD FOR RESOURCE ALLOCATION IN WIRELESS COMMUNICATIONS

RELATED APPLICATIONS

This application is based upon and claims the benefit of priority from U.S. Provisional Patent Application No. 61/302,706, filed Feb. 9, 2010, the entire contents of which are incorporated herein by reference.

TECHNICAL FIELD

This disclosure relates to apparatus and method for resource allocation in wireless communications.

BACKGROUND

Wideband transmission with high spectral efficiency and high mobility is desirable for future wireless communications. Promising techniques to achieve such wideband transmission include an orthogonal frequency-division multiplexing (OFDM) technique.

A traditional OFDM-based communication system uses a plurality of closely-spaced orthogonal subcarriers to carry data. The data may be allocated on a plurality of parallel subchannels, one for each of the subcarriers. Each of the subcarriers may be modulated with a conventional modulation scheme, e.g., quadrature amplitude modulation, at a relatively low symbol rate. In addition, an inverse fast Fourier transform (IFFT) may be performed on OFDM symbols representing the data on a transmitter side, e.g., at a base station, and a fast Fourier transform (FFT) may be performed to recover the OFDM symbols on a receiver side, e.g., at a mobile station.

Traditionally, the base station allocates available resources, e.g., time and frequency resources, for the mobile station to receive data from, or transmit data to, the base station. The base station further uses a control channel to indicate to the mobile station the allocated resources.

The available resources may include a plurality of resource units (RUs). An RU typically comprises a first plurality of consecutive subcarrier frequencies and a second plurality of consecutive times corresponding to respective OFDM symbols, and is a basic unit for resource allocation. For example, in the IEEE 802.16 standard, 24 RUs may be used to perform resource allocation if the communication system has a 5-MHz bandwidth, 48 RUs may be used to perform resource allocation if the communication system has a 10-MHz bandwidth, and 96 RUs may be used to perform resource allocation if the communication system has a 20-MHz bandwidth.

The base station may partition the available resources into a plurality of subbands each including multiple RUs, and a plurality of minibands each including, e.g., one RU, to reduce feedback overhead. Typically, the subbands are suitable for frequency selective allocation as the subbands provide a contiguous allocation of RUs in frequency, and the minibands are suitable for frequency diverse allocation as the minibands are permuted in frequency.

FIG. 1 illustrates a traditional method 100 for the base station to partition available resources into a plurality of subbands 102. Based on the method 100, the base station partitions the available resources into the plurality of subbands 102 each including four contiguous RUs.

FIG. 2 illustrates a traditional method 200 for the base station to perform resource allocation for a plurality of mobile stations, e.g., $MS_0$, $MS_1$, ..., and $MS_7$. The base station may partition available resources including a plurality of RUs, referred to herein as physical RUs (PRUs) 202, each represented by a small block in FIG. 2, into a plurality of subbands 204 and a plurality of minibands 206. Each of the subbands 204 may comprise multiple contiguous PRUs, e.g., four contiguous PRUs, and each of the minibands 206 may comprise one PRU.

The base station may further group the PRUs 202 in the subbands 204 into a subband group. The PRUs 202 in the subband group are also known as contiguous resource units (CRUs) 208, because they are contiguous across localized resource allocations. The base station may also group the PRUs 202 in the minibands 206 into a miniband group and perform permutation on those PRUs. The permuted PRUs in the miniband group are also known as distributed resource units (DRUs) 210, because they are spread across distributed resource allocations.

The CRUs 208 and the DRUs 210 form logical resource units (LRUs) 212. The base station may perform resource allocation to each of the mobile stations based on individual LRUs, or on a whole subband. For example, the base station may allocate individual LRUs to a mobile station, e.g., $MS_0$, $MS_1$, $MS_2$, $MS_4$, $MS_5$, $MS_6$, or $MS_7$. These LRUs for the corresponding MSs may be indicated by basic assignment A-MAP information elements (IEs). Also for example, the base station may allocate one or more subbands to a mobile station, e.g., $MS_3$. These subbands may be indicated by a subband assignment A-MAP information element (IE). The basic and subband assignment A-MAP IEs are located in an A-MAP region, which typically consists of the first several DRUs.

Further, for example, $MS_3$ may only need to perform data transmission at a relatively low data transmission rate, such as when running a Voice over Internet Protocol (VoIP) application or a gaming application. As a result, it may be inefficient for the base station to allocate the whole subband to $MS_3$.

SUMMARY

According to a first aspect of the present disclosure, there is provided a method for a base station to allocate resources to a mobile station, the resources being included in one or more subbands each including a plurality of resource units, the method comprising: allocating a part of a first one of the subbands to the mobile station, the part including one or more resource units in the first one of the subbands; and indicating to the mobile station the allocated part of the first one of the subbands by indicating a resource allocation pattern corresponding to the allocated part of the first one of the subbands.

According to a second aspect of the present disclosure, there is provided a base station to allocate resources to a mobile station, the resources being included in one or more subbands each including a plurality of resource units, the base station comprising: a processor, the processor being configured to: allocate a part of a first one of the subbands to the mobile station, the part including one or more resource units in the first one of the subbands; and indicate to the mobile station the allocated part of the first one of the subbands by indicating a resource allocation pattern corresponding to the allocated part of the first one of the subbands.

According to a third aspect of the present disclosure, there is provided a method for a mobile station to receive resource allocation from a base station, the base station providing a plurality of resource allocation patterns each corresponding to a specific resource unit or a specific combination of resource units in a subband, the method comprising: receiving a resource allocation indicator from the base station, the resource allocation indicator indicating one or more subbands and one of the resource allocation patterns; and determining, based on the resource allocation indicator, that a part of a first one of the subbands is allocated to the mobile station, the part including one or more resource units in the first one of the subbands.

According to a fourth aspect of the present disclosure, there is provided a mobile station to receive resource allocation from a base station, the base station providing a plurality of resource allocation patterns each corresponding to a specific resource unit or a specific combination of resource units in one subband, the mobile station comprising: a processor, the processor being configured to: receive a resource allocation indicator from the base station, the resource allocation indicator indicating one or more subbands and one of the resource allocation patterns; and determine, based on the resource allocation indicator, that a part of a first one of the subbands is allocated to the mobile station, the part including one or more resource units in the first one of the subbands.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 19 illustrates a block diagram of a mobile station, according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
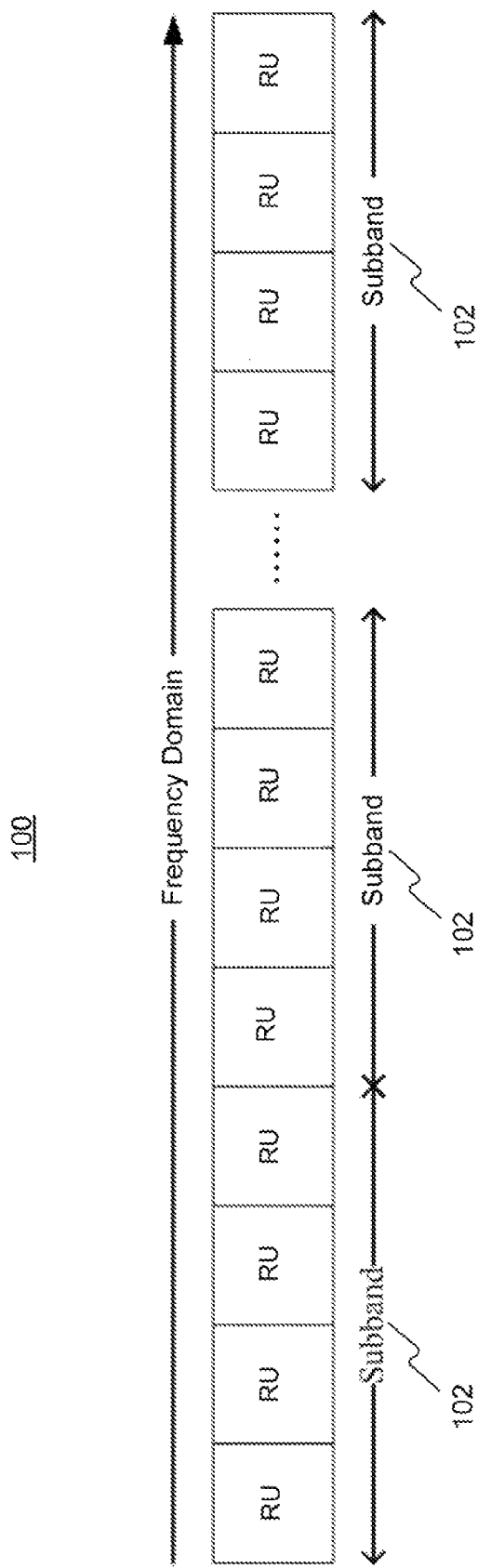
FIG. 1 illustrates a traditional method for a base station to partition available resources into a plurality of subbands.
Figure 2:
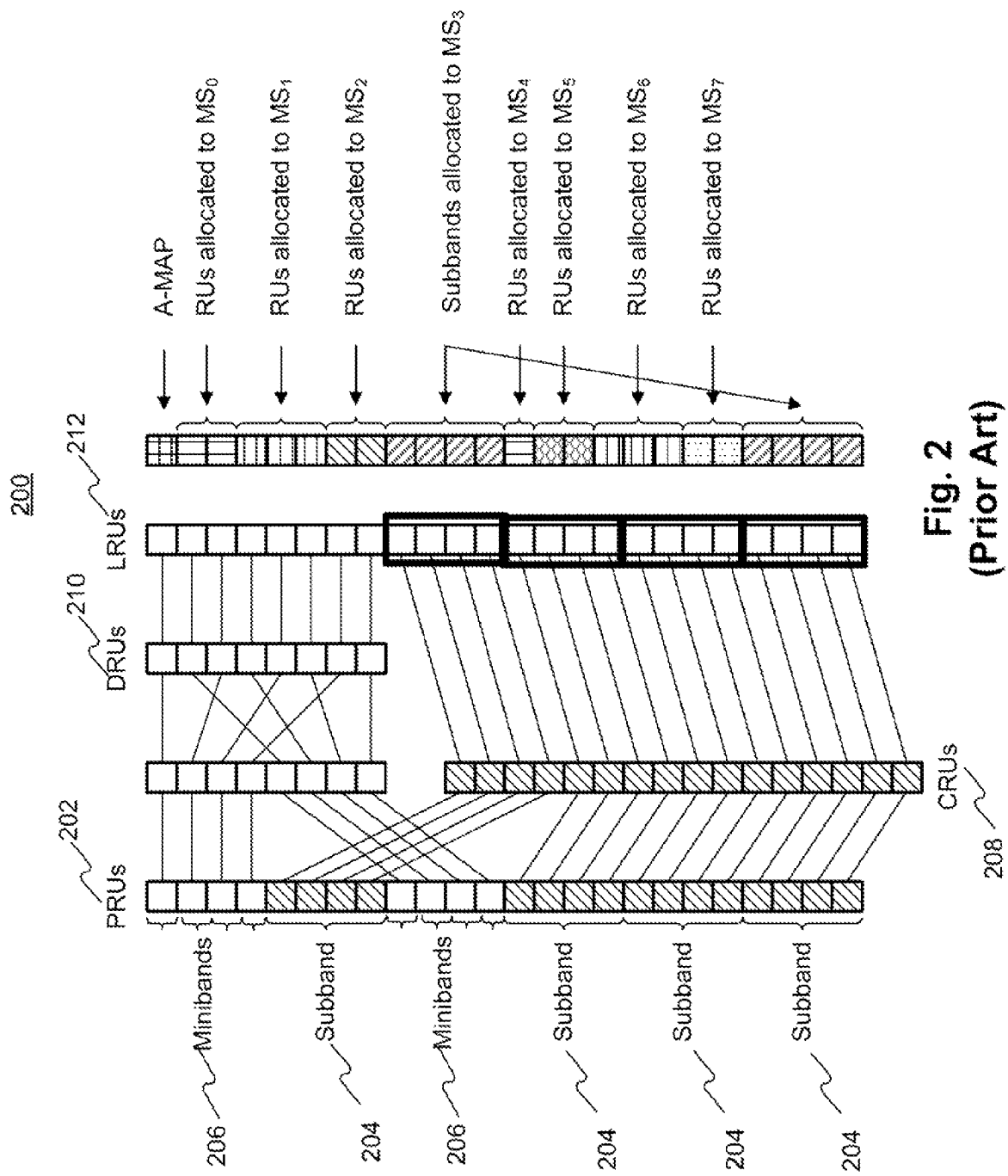
FIG. 2 illustrates a traditional method for a base station to perform resource allocation for a plurality of mobile stations.
Figure 3:
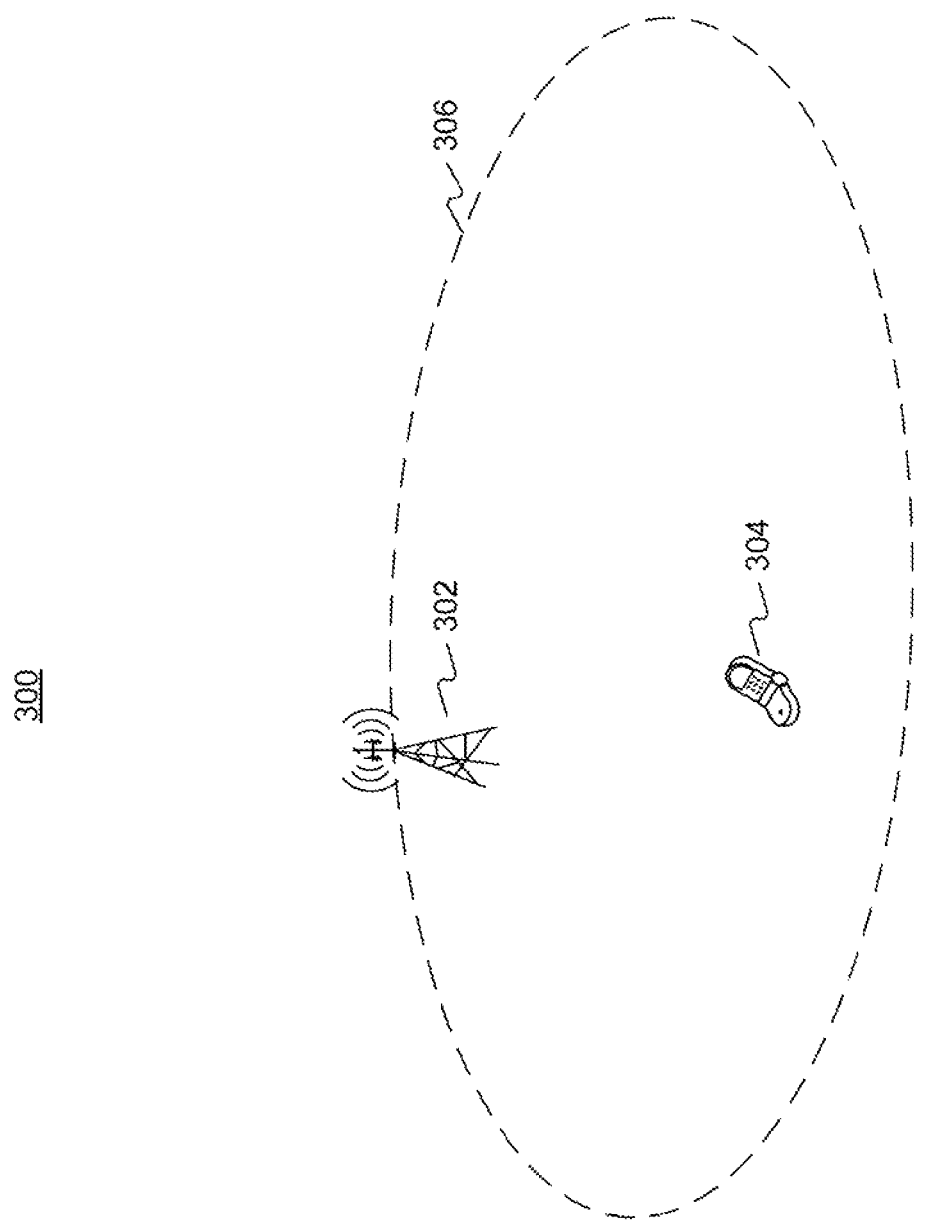
FIG. 3 illustrates a block diagram of a wireless communication system, according to an exemplary embodiment.

FIG. 3 illustrates a block diagram of a wireless communication system 300, according to an exemplary embodiment. The communication system 300 includes a base station 302 and one or more mobile stations, such as a mobile station 304, located in a cell 306 covered by the base station 302. The base station 302 and the mobile stations may communicate based on the orthogonal frequency-division multiplexing (OFDM) technique. In addition, the communication system 300 may operate in accordance with different wireless communication standards, including, e.g., the IEEE 802.16 family of standards, the 3rd Generation Partnership Project (3GPP) standard, the High-Speed Packet Access (HSPA) standard, the Long Term Evolution (LTE) standard, etc.

In exemplary embodiments, the base station 302 allocates available resources, e.g., time and frequency resources, for the mobile stations in the communication system 300 to receive data from, or transmit data to, the base station 302. The base station 302 may further use a control channel to indicate to the mobile stations the allocated resources.

In exemplary embodiments, the available resources may include a plurality of resource units (RUs). An RU typically comprises a first plurality of consecutive subcarrier frequencies and a second plurality of consecutive times corresponding to respective OFDM symbols, and is a basic unit for resource allocation. The base station 302 may partition the available resources into a plurality of subbands each including multiple RUs and/or a plurality of minibands each including, e.g., one RU.

In exemplary embodiments, the base station 302 is configured to determine a number of subbands to be allocated, and to allocate one or more subbands, to any mobile station in the communication system 300, e.g., the mobile station 304. Each of the allocated subbands may be either a completely allocated subband or a partially allocated subband for the mobile station 304. For a completely allocated subband, the base station 302 allocates all RUs in the subband to the mobile station 304. For a partially allocated subband, the base station 302 allocates a part of the subband, i.e., one or more, but not all, of the RUs in that subband, to the mobile station 304.

For example, when the base station 302 allocates first and second subbands to the mobile station 304, the base station 302 may allocate all RUs in the first subband and one or more, but not all, RUs in the second subband to the mobile station 304. Therefore the first subband is a completely allocated subband for the mobile station 304, and the second subband is a partially allocated subband for the mobile station 304.

In exemplary embodiments, the base station 302 is configured to indicate to the mobile station 304 allocated resources by indicating one or more subbands, each being either a completely allocated subband or a partially allocated subband for the mobile station 304. The base station 302 is further configured to use a plurality of predetermined resource allocation patterns to indicate which RU(s) in the partially allocated subband are allocated to the mobile station 304, each of the predetermined resource allocation patterns corresponding to a specific RU or a specific combination of RUs in a subband.

Figure 4:
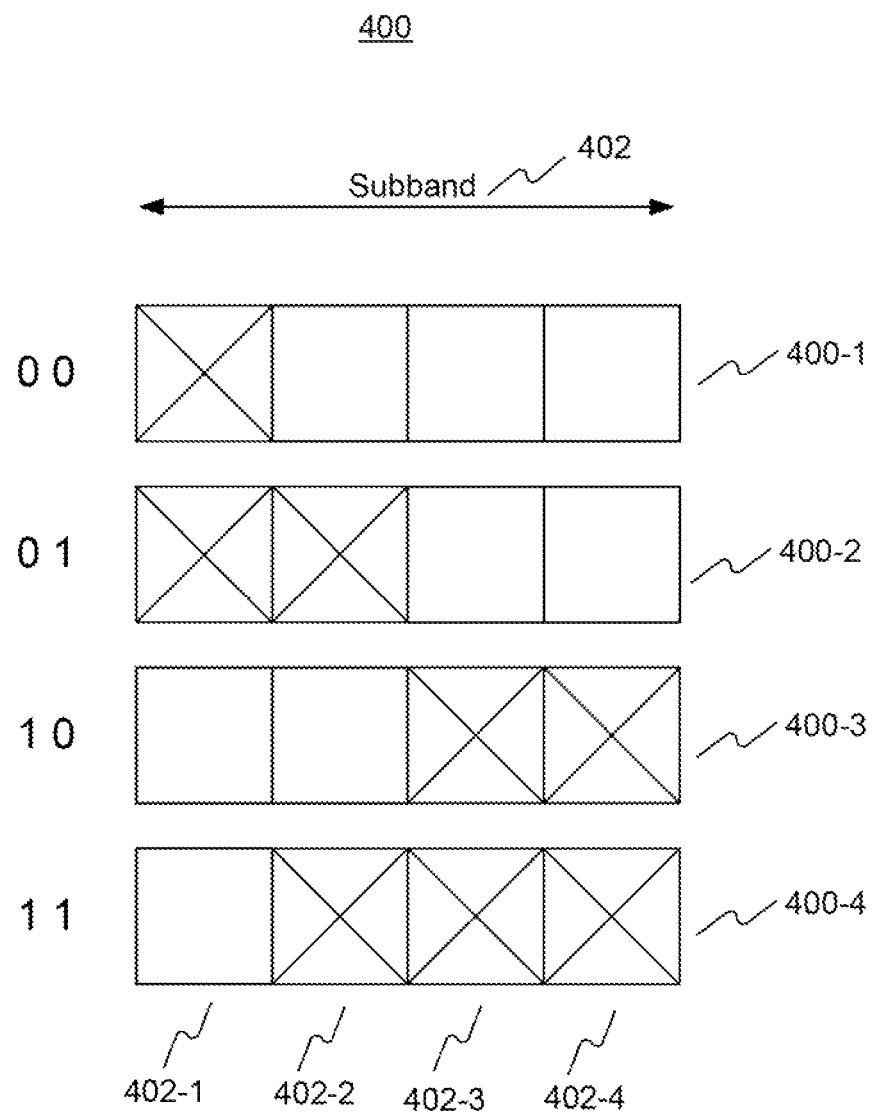
FIG. 4 shows a plurality of predetermined resource allocation patterns used by a base station to indicate which resource unit(s) in a partially allocated subband are allocated to a mobile station, according to an exemplary embodiment.

FIG. 4 shows a plurality of predetermined resource allocation patterns 400 used by the base station 302 (FIG. 3) to indicate which RU(s) in a partially allocated subband 402 are allocated to the mobile station 304 (FIG. 3), according to an exemplary embodiment. In the exemplary embodiment, the subband 402 includes first, second, third, and fourth RUs 402-1, 402-2, 402-3, and 402-4, respectively, each represented by a small block in FIG. 4, and the predetermined resource allocation patterns 400 may include first, second, third, and fourth resource allocation patterns 400-1, 400-2, 400-3, and 400-4, respectively.

In exemplary embodiments, each of the resource allocation patterns 400-1, 400-2, 400-3, and 400-4 corresponds to a specific RU or a specific combination of RUs in the subband 402, represented by the "X"(s) in each resource allocation pattern, and indicates that the specific RU or the specific combination of RUs are allocated to the mobile station 304. For example, the first resource allocation pattern 400-1 may correspond to the first RU 402-1, and indicate that the first RU 402-1 is allocated to the mobile station 304. Also for example, the second resource allocation pattern 400-2 may correspond to the first and second RUs 402-1 and 402-2, and indicate that the first and second RUs 402-1 and 402-2 are allocated to the mobile station 304. Further for example, the third resource allocation pattern 400-3 may correspond to the third and fourth RUs 402-3 and 402-4, and indicate that the third and fourth RUs 402-3 and 402-4 are allocated to the mobile station 304. As another example, the fourth resource allocation pattern 400-4 may correspond to the second, third, and fourth RUs 402-2, 402-3, and 402-4, and indicate that the second, third, and fourth RUs 402-2, 402-3, and 402-4 are allocated to the mobile station 304.

In exemplary embodiments, ones of the predetermined resource allocation patterns may cover all RUs in a subband without overlapping. For example, the first resource allocation pattern 400-1 and the fourth resource allocation pattern 400-4 cover all RUs in the subband 402 without overlapping. Also for example, the second resource allocation pattern 400-2 and the third resource allocation pattern 400-3 cover all RUs in the subband 402 without overlapping.

In exemplary embodiments, two bits may arbitrarily be assigned to represent the resource allocation patterns 400-1, 400-2, 400-3, and 400-4. For example, "00," "01," "10," and "11" may be used to represent the resource allocation patterns 400-1, 400-2, 400-3, and 400-4, respectively.

Figure 5:
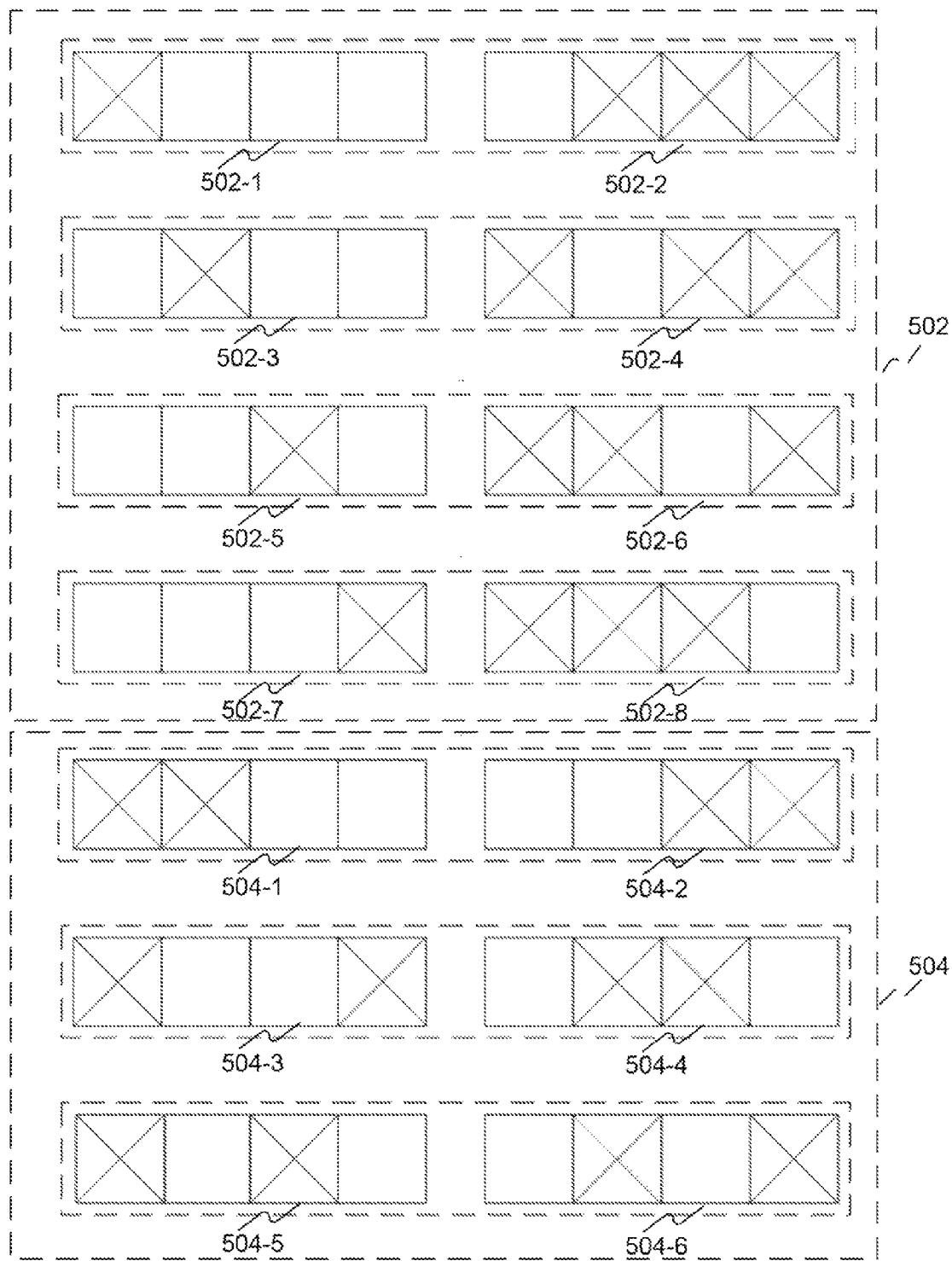
FIG. 5 illustrates a method to predetermine a plurality of resource allocation patterns, according to an exemplary embodiment.

FIG. 5 illustrates a method 500 to predetermine a plurality of resource allocation patterns, such as the predetermined resource allocation patterns 400 (FIG. 4), according to an exemplary embodiment. In the exemplary embodiment, a subband includes four RUs, and may be shared by first and second mobile stations. In another exemplary embodiment, the subband may be shared by up to four mobile stations. The shared subband is a partially allocated subband for each of the mobile stations.

In exemplary embodiments, the plurality of resource allocation patterns may be predetermined from first or second groups 502 and 504 of basic patterns. The first group 502 includes basic patterns 502-1, 502-3, 502-5, and 502-7 used to indicate which one RU in a subband is allocated to the first mobile station, and basic patterns 502-2, 502-4, 502-6, and 502-8 used to indicate which three remaining RUs in the subband are allocated to the second mobile station, respectively. The second group 504 includes basic patterns 504-1, 504-3, and 504-5 used to indicate which two RUs in a subband are allocated to the first mobile station, and basic patterns 504-2, 504-4, and 504-6 used to indicate which two remaining RUs in the subband are allocated to the second mobile station, respectively.

In the first group 502, the basic patterns 502-1 and 502-2 are complementary patterns, because they together indicate all the RUs in the subband without overlap, so that any RU in the subband may not be simultaneously allocated to the first and second mobile stations. Similarly, the basic patterns 502-3 and 502-4 are complementary patterns, the basic patterns 502-5 and 502-6 are complementary patterns, and the basic patterns 502-7 and 502-8 are complementary patterns.

In the second group 504, the basic patterns 504-1 and 504-2 are complementary patterns because they together indicate all the RUs in the subband without overlap, so that any RU in the subband may not be simultaneously allocated to the first and second mobile stations. Similarly, the basic patterns 504-3 and 504-4 are complementary patterns, and the basic patterns 504-5 and 504-6 are complementary patterns.

In exemplary embodiments, a total of four basic patterns, including two basic patterns 502-i from the first group 502 and two basic patterns 504-i from the second group 504, may be selected to form the plurality of predetermined resource allocation patterns to be used by the base station 302 (FIG. 3). For example, the basic patterns 502-1 and 502-2 in the first group 502 and the basic patterns 504-1 and 504-2 in the second group 504 may be selected to form the plurality of predetermined resource allocation patterns 400 (FIG. 4).

In exemplary embodiments, two of basic patterns 502-1, 502-3, 502-5 and 502-7 from the first group 502 and one basic pattern 504-i from the second group 504, may be selected to form the plurality of predetermined resource allocation patterns to be used by the base station 302 (FIG. 3). For example, the basic patterns 502-1 and 502-2 in the first group 502 and the basic pattern 504-2 in the second group 504 may be selected to form the plurality of predetermined resource allocation patterns. In addition, the basic patterns 502-1, 502-3, 502-5, and 502-7 in the first group 502 may also be selected to form the plurality of predetermined resource allocation patterns.

In exemplary embodiments, the method 500 may be implemented on a computer to predetermine the plurality of resource allocation patterns. The base station 302 (FIG. 3) may then be configured to provide the plurality of predetermined resource allocation patterns, and to use the plurality of predetermined resource allocation patterns to indicate which RU(s) in a partially allocated subband are allocated to the mobile station 304 (FIG. 3). Alternatively, the base station 302 (FIG. 3) may use the method 500 to predetermine the plurality of resource allocation patterns.

Figure 6:
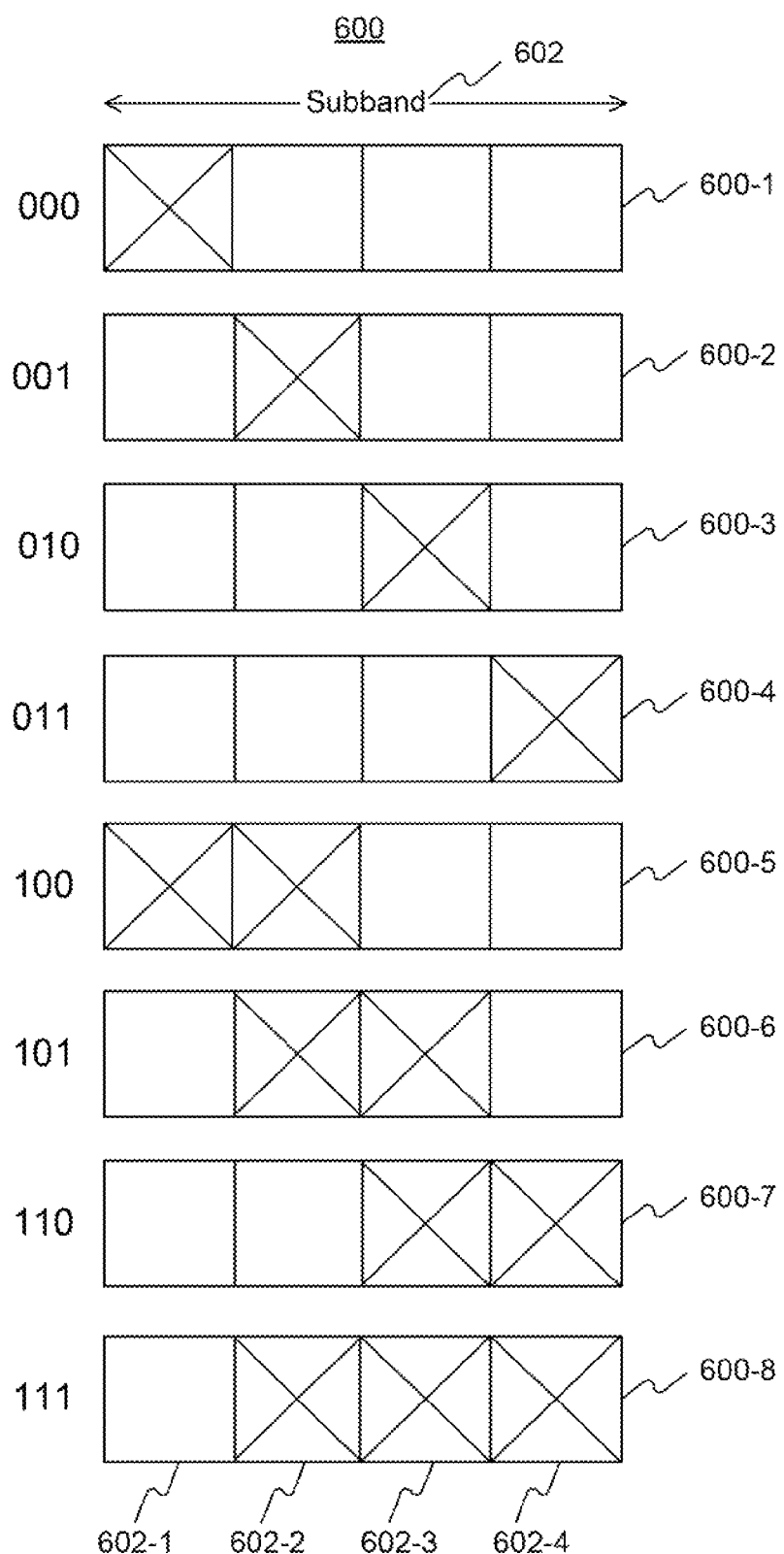
FIG. 6 shows a plurality of predetermined resource allocation patterns used by a base station to indicate which resource unit(s) in a partially allocated subband are allocated to a mobile station, according to an exemplary embodiment.

FIG. 6 shows a plurality of predetermined resource allocation patterns 600 used by the base station 302 (FIG. 3) to indicate which RU(s) in a partially allocated subband 602 are allocated to the mobile station 304 (FIG. 3), according to an exemplary embodiment. In the exemplary embodiment, the subband 602 includes first, second, third, and fourth RUs 602-1, 602-2, 602-3, and 602-4, respectively, each represented by a small block in FIG. 6, and the predetermined resource allocation patterns 600 may include first, second, . . . , and eighth predetermined resource allocation patterns 600-1, 600-2, . . . , and 600-8, respectively.

In exemplary embodiments, each of the predetermined resource allocation patterns 600-1, 600-2, . . . , and 600-8 corresponds to a specific RU or a specific combination of RUs in the subband 602, represented by the "X"(s) in each resource allocation pattern, and is used to indicate that the specific RU or the specific combination of RUs are allocated to the mobile station 304. For example, the first resource allocation pattern 600-1 may correspond to the first RU 602-1, and indicate that the first RU 602-1 is allocated to the mobile station 304. Also for example, the fifth resource allocation pattern 600-5 may correspond to the first and second RUs 602-1 and 602-2, and indicate that the first and second RUs 602-1 and 602-2 are allocated to the mobile station 304. Further for example, the eighth resource allocation pattern 600-8 may correspond to the second, third, and fourth RUs 602-2, 602-3, and 602-4, and indicate that the second, third, and fourth RUs 602-2, 602-3, and 602-4 are allocated to the mobile station 304.

In exemplary embodiments, ones of the predetermined resource allocation patterns may cover all RUs in a subband without overlapping. For example, the first, second, third, and fourth resource allocation patterns 600-1, 600-2, 600-3, and 600-4 cover all RUs in the subband 602 without overlapping. Also for example, the fifth and seventh resource allocation patterns 600-5 and 600-7 cover all RUs in the subband 602 without overlapping.

In exemplary embodiments, three bits may arbitrarily be assigned to represent the resource allocation patterns 600-1, 600-2, . . . , and 600-8. For example, "000," "001," "010," "011," "100," "101," "110," and "111" may be used to represent the resource allocation patterns 600-1, 600-2, 600-3, 600-4, 600-5, 600-6, 600-7, and 600-8, respectively.

Figure 7:
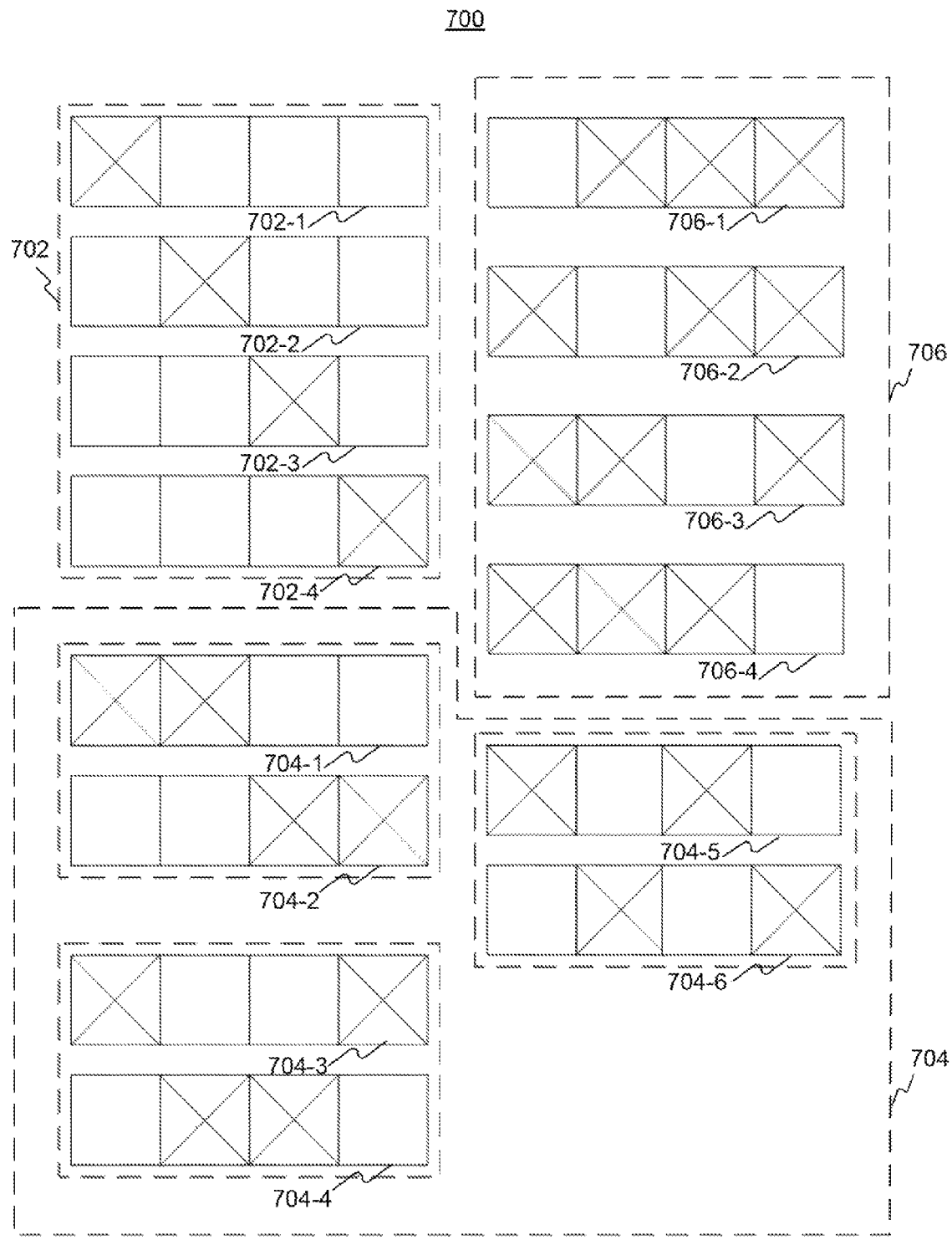
FIG. 7 illustrates a method to predetermine a plurality of resource allocation patterns, according to an exemplary embodiment.

FIG. 7 illustrates a method 700 to predetermine a plurality of resource allocation patterns, such as the predetermined resource allocation patterns 600 (FIG. 6), according to one exemplary embodiment. In the exemplary embodiment, a subband includes four RUs, and may be shared by two, three, or four mobile stations. The shared subband is a partially allocated subband for each of the two, three, or four mobile stations.

In exemplary embodiments, the plurality of resource allocation patterns may be predetermined from first, second, and third groups 702, 704, and 706 of basic patterns. The first group 702 includes basic patterns 702-1, 702-2, 702-3, and 702-4 used to indicate which one RU in a subband is allocated to a mobile station. The second group 704 includes basic patterns 704-1, 704-2, . . . , and 704-6 used to indicate which two RUs in a subband are allocated to a mobile station. The third group 706 includes basic patterns 706-1, 706-2, 706-3, and 706-4 used to indicate which three RUs in a subband are allocated to a mobile station.

Similar to the above description in connection with FIG. 5, the basic patterns 702-1, 702-2, 702-3, and 702-4 in the first group 702 are complementary patterns. The basic patterns 704-1 and 704-2 in the second group 704 are complementary patterns. The basic patterns 704-3 and 704-4 in the second group 704 are complementary patterns. The basic patterns 704-5 and 704-6 in the second group 704 are complementary patterns. In addition, the basic pattern 702-*i* in the first group 702 and the basic pattern 706-*i* in the third group 706 are complementary patterns. Two basic patterns in the first group 702 and one basic pattern in the second group 704 may also be complementary patterns.

The plurality of resource allocation patterns may be predetermined from the first, second, and third groups 702, 704, and 706 of basic patterns. For example, if four mobile stations share a subband, the basic patterns 702-1, 702-2, 702-3, and 702-4 in the first group 702 may be used to indicate resource allocation to the four mobile stations. Also for example, if three mobile stations share a subband and one of the three mobile stations is allocated with two RUs in the subband, two patterns from the first group 702 and one pattern from the second group 704 may be used to indicate resource allocation to the three mobile stations. Further for example, if two mobile stations share a subband and each of the two mobile stations is allocated with two RUs in the subband, two patterns for the second group 704 may be used to indicate resource allocation to the two mobile stations. As another example, if two mobile stations share a subband and one of the two mobile stations is allocated with three RUs in the subband, one pattern from the first group 702 and one pattern from the third group 706 may be used to indicate resource allocation to the two mobile stations.

In exemplary embodiments, a total of seven basic patterns, including all the four basic patterns from the first group 702, two basic patterns from the second group 704, and one basic pattern from the third group 706, may be selected to form the plurality of predetermined resource allocation patterns to be used by the base station 302 (FIG. 3). Because at least three bits are needed to represent the seven basic patterns, and the three bits may represent at most eight basic patterns, an additional basic pattern from the second group 704 or from the third group 706 may be further selected to form the plurality of predetermined resource allocation patterns.

In one exemplary embodiment, all the four basic patterns 702-1, 702-2, 702-3, and 702-4 in the first group 702, the basic patterns 704-1, 704-2, and 704-4 in the second group 704, and the basic pattern 706-1 in the third group 706 are selected to form the predetermined resource allocation patterns 600 (FIG. 6).

In exemplary embodiments, the method 700 may be implemented on a computer to predetermine the plurality of resource allocation patterns. The base station 302 (FIG. 3) may then be configured to provide the plurality of predetermined resource allocation patterns, and to use the plurality of predetermined resource allocation patterns to indicate which RU(s) in a partially allocated subband are allocated to the mobile station 304 (FIG. 3). Alternatively, the base station 302 (FIG. 3) may use the method 700 to predetermine the plurality of resource allocation patterns.

Referring back to FIG. 3, in exemplary embodiments, the base station 302 is configured to transmit a resource allocation indicator, also referred to as a subband assignment A-MAP, to indicate resource allocation to the mobile station 304. The resource allocation indicator has a plurality of bits, e.g., eleven bits. The mobile station 304 receives the resource allocation indicator from the base station 302, and determines its resource allocation based on the resource allocation indicator.

In exemplary embodiments, the resource allocation indicator includes at least a resource indexing field (RIF) and a pattern indication field (PIF). The RIF occupies a first plurality of bits, e.g., seven bits, in the resource allocation indicator, and is used to indicate which subband(s) are allocated to the mobile station 304, each of the subband(s) being either a completely allocated subband or a partially allocated subband for the mobile station 304. The PIF occupies a second plurality of bits, e.g., two or three bits, in the resource allocation indicator, and is used to indicate which RU(s) in a partially allocated subband are allocated to the mobile station 304.

In exemplary embodiments, the resource allocation indicator may further include a location field (LF). The LF occupies, e.g., one bit, in the resource allocation indicator, and is used to indicate which subband allocated to the mobile station 304 is a partially allocated subband. Alternatively, the base station 302 may designate any one of the allocated subbands as a partially allocated subband. For example, the base station 302 may designate one of the allocated subbands that has the highest or lowest subband index as the partially allocated subband.

FIGS. 8-17 illustrate resource allocation indicators 800-1700, according to exemplary embodiments. In the exemplary embodiments, it is assumed that each subband includes four RUs.

Figure 8:
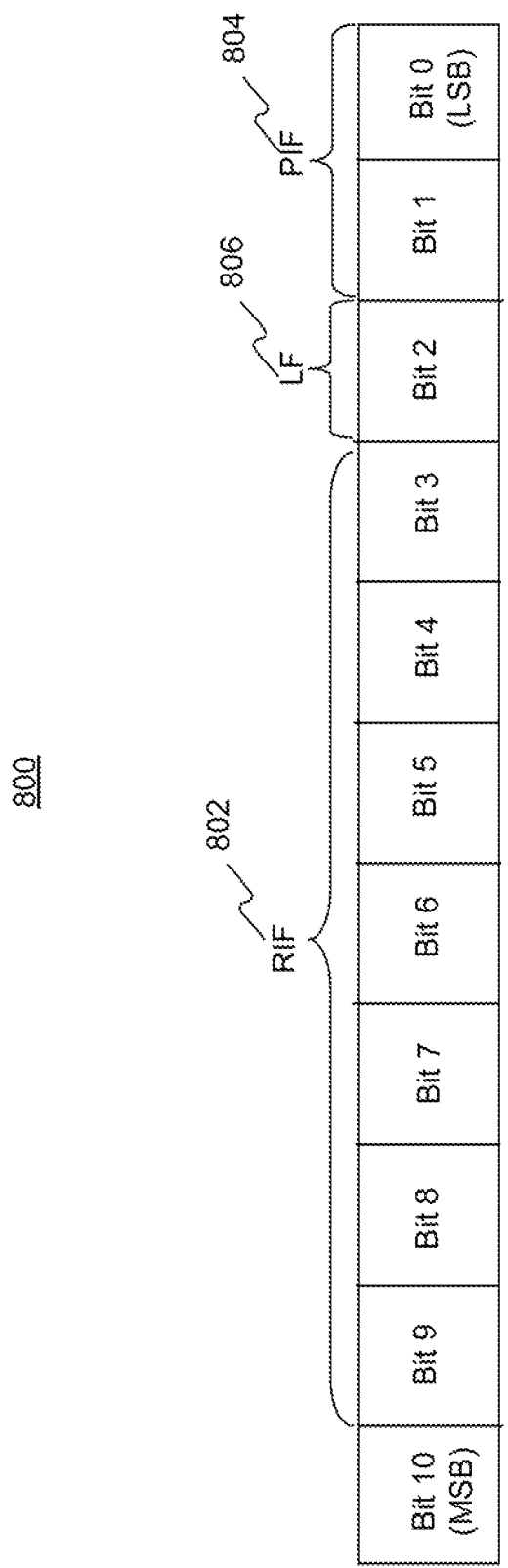
FIGS. 8-17 illustrate resource allocation indicators, according exemplary embodiments.

FIG. 8 illustrates the resource allocation indicator 800 for the base station 302 (FIG. 3) to indicate resource allocation to the mobile station 304 (FIG. 3), according to an exemplary embodiment. In the exemplary embodiment, the base station 302 uses the resource allocation indicator 800 to indicate two subbands, e.g., subbands u and v (u and v being subband indexes, u<v), including resources allocated to the mobile station 304. The base station 302 generates the resource allocation indicator 800 based on the predetermined resource allocation patterns 400 (FIG. 4).

Referring to FIGS. 3, 4, and 8, in exemplary embodiments, the resource allocation indicator 800 may have eleven bits, i.e., bit 10, bit 9, . . . , and bit 0, wherein bit 10 is the most significant bit (MSB) and bit 0 is the least significant bit (LSB). The resource allocation indicator 800 includes an RIF 802, a PIF 804, and an LF 806.

In exemplary embodiments, the RIF 802 may occupy seven bits of the resource allocation indicator 800, e.g., bit 9, bit 8, . . . bit 3, and is used to indicate which subbands are allocated to the mobile station 304. A value of the RIF 802 may be determined as follows:

$$RIF = \left\{ \begin{array}{c} u \\ 1 \end{array} \right\} + \left\{ \begin{array}{c} v \\ 2 \end{array} \right\}, u < v, \quad \text{equation (1)}$$

where "{ }" denotes an extended-binomial-coefficient calculation, i.e., $$\left\{ \begin{array}{c} n \\ k \end{array} \right\} = \left\{ \begin{array}{ll} \frac{n!}{k!(n-k)!} & \text{for } k \leq n \\ 0 & \text{for } k > n, \end{array} \right.$$

n and k being integers.

In one exemplary embodiment, values of the RIF 802 are predetermined based on different combinations of values of u and v. The predetermined values of the RIF 802 are then stored as a look-up table in the base station 302.

In exemplary embodiments, the LF 806 may occupy one bit of the resource allocation indicator 800, e.g., bit 2, and is used to indicate which one of subband u or subband v is a partially allocated subband for the mobile station 304. For example, the LF 806 being "0" may indicate that subband v, i.e., the subband having a higher index, is a partially allocated subband for the mobile station 304, and the LF 806 being "1" may indicate that subband u, i.e., the subband having a lower index, is a partially allocated subband for the mobile station 304.

In exemplary embodiments, the PIF 804 may occupy two bits of the resource allocation indicator 800, e.g., bit 1 and bit 0, and is used to indicate which RU(s) in the partially allocated subband are allocated to the mobile station 304, by indicating a corresponding resource allocation pattern in the predetermined resource allocation patterns 400.

For example, assuming the LF 806 being "1" indicating that subband u is a partially allocated subband for the mobile station 304, the PIF 804 being "00" indicates that the first RU in subband u is allocated to the mobile station 304 by indicating the corresponding resource allocation pattern 400-1 in the predetermined resource allocation patterns 400, the PIF 804 being "01" indicates that the first and second RUs in subband u are allocated to the mobile station 304 by indicating the corresponding resource allocation pattern 400-2 in the predetermined resource allocation patterns 400, the PIF 804 being "10" indicates that the third and fourth RUs in subband u are allocated to the mobile station 304 by indicating the corresponding resource allocation pattern 400-3 in the predetermined resource allocation patterns 400, and the PIF 804 being "11" indicates that the second, third, and fourth RUs in subband u are allocated to the mobile station 304 by indicating the corresponding resource allocation pattern 400-4 in the predetermined resource allocation patterns 400.

Figure 9:
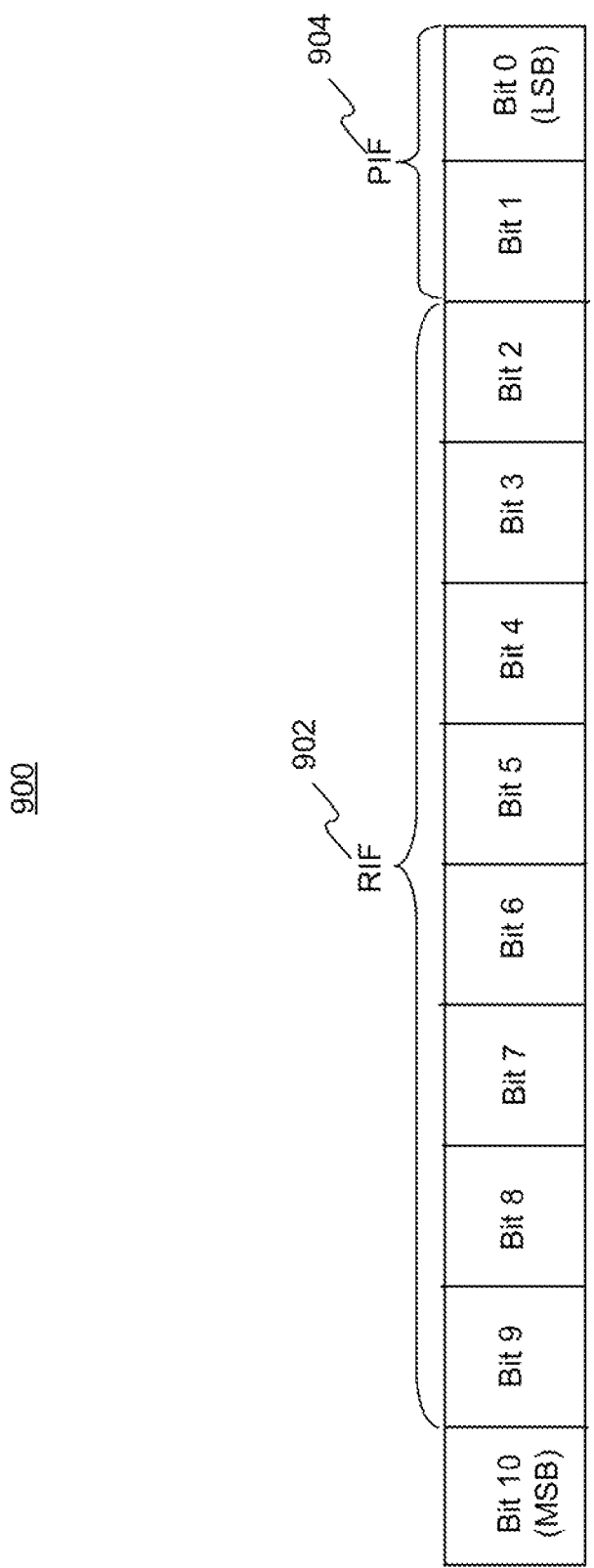

FIG. 9 illustrates the resource allocation indicator 900 for the base station 302 (FIG. 3) to indicate resource allocation to the mobile station 304 (FIG. 3), according to an exemplary embodiment. In the exemplary embodiment, the communication system 300 (FIG. 3) has a bandwidth of 20 MHz, and more than eleven subbands are available for allocation in the communication system 300. The base station 302 uses the resource allocation indicator 900 to indicate two subbands, e.g., subbands u and v (u and v being subband indexes, u<v), including resources allocated to the mobile station 304. The base station 302 generates the resource allocation indicator 900 based on the predetermined resource allocation patterns 400 (FIG. 4).

Referring to FIGS. 3, 4, and 9, in exemplary embodiments, the resource allocation indicator 900 may have eleven bits, i.e., bit 10, bit 9, . . . , and bit 0, wherein bit 10 is the MSB and bit 0 is the LSB. The resource allocation indicator 900 includes an RIF 902 and a PIF 904. The base station 302 designates one of subband u and subband v, e.g., subband v that has a higher subband index, as a partially allocated subband.

In exemplary embodiments, the RIF 902 may occupy eight bits of the resource allocation indicator 900, e.g., bit 9, bit 8, . . . bit 2, and is used to indicate which subbands are allocated to the mobile station 304. A value of the RIF 902 may be determined based on equation (1).

In exemplary embodiments, the PIF 904 may occupy two bits of the resource allocation indicator 900, e.g., bit 1 and bit 0, and is used to indicate which RU(s) in the partially allocated subband are allocated to the mobile station 304, by indicating a corresponding resource allocation pattern in the predetermined resource allocation patterns 400.

In exemplary embodiments, one additional bit (not shown), referred to herein as a NumIEs bit, may be used together with the MSB in the resource allocation indicator 900 for indicating that the communication system 300 has a bandwidth of 20 MHz, and more than eleven subbands are available for allocation in the communication system 300. For example, the NumIEs bit and the MSB may both be set to "1" for the indication in partial subband allocation.

Figure 10:
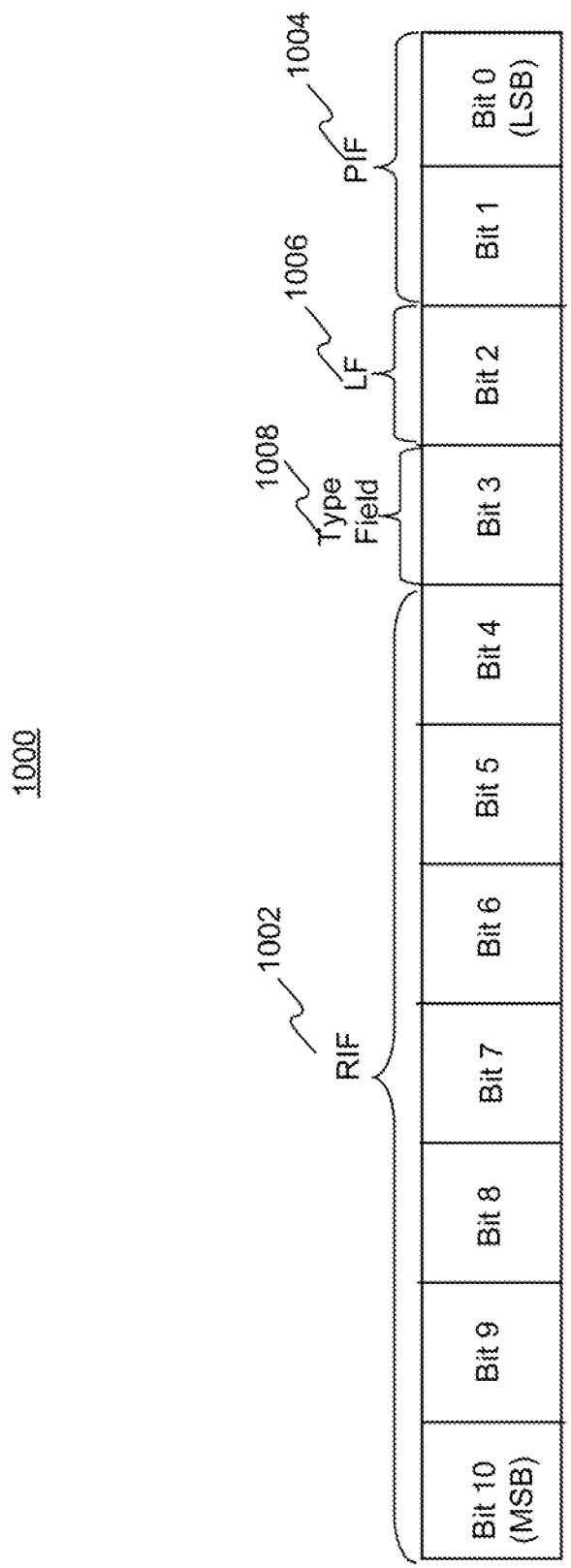

FIG. 10 illustrates the resource allocation indicator 1000 for the base station 302 (FIG. 3) to indicate resource allocation to the mobile station 304 (FIG. 3), according to an exemplary embodiment. In the exemplary embodiment, fewer than twelve subbands are available for allocation in the communication system 300. The base station 302 uses the resource allocation indicator 1000 to indicate two subbands, e.g., subbands u and v, or three subbands, e.g., subbands u, v, and w (u, v, and w being subband indexes, u<v<w), including resources allocated to the mobile station 304. The base station 302 generates the resource allocation indicator 1000 based on the predetermined resource allocation patterns 400 (FIG. 4).

Referring to FIGS. 3, 4, and 10, in exemplary embodiments, the resource allocation indicator 1000 may have eleven bits, i.e., bit 10, bit 9, . . . , and bit 0, wherein bit 10 is the MSB and bit 0 is the LSB. The resource allocation indicator 1000 includes an RIF 1002, a PIF 1004, an LF 1006, and a type field 1008.

In exemplary embodiments, the type field 1008 may occupy one bit of the resource allocation indicator 1000, e.g., bit 3, and is used to indicate whether two or three non-special subbands are allocated to the mobile station 304. A special subband is defined as the subband that has the highest index among the available subbands in the communication system 300. For example, the type field 1008 being "0" may indicate three non-special subbands, e.g., subbands u, v, and w (subband w being a non-special subband) are allocated to the mobile station 304. Also for example, the type field 1008 being "1" may indicate two subbands, e.g., subbands u and v, or two non-special subbands and the special subband, e.g., subbands u, v, and w (subband w being the special subband), are allocated to the mobile station 304.

In exemplary embodiments, the RIF 1002 may occupy seven bits of the resource allocation indicator 1000, e.g., bit 10, bit 9, . . . bit 4, and is used to indicate which subbands are allocated to the mobile station 304. If the type field 1008 is "0" indicating three non-special subbands allocated to the mobile station 304, a value of the RIF 1002 may be determined as follows:

$$RIF = \begin{Bmatrix} u \\ 1 \end{Bmatrix} + \begin{Bmatrix} v \\ 2 \end{Bmatrix} + \begin{Bmatrix} w \\ 3 \end{Bmatrix}, u < v < w, \quad \text{equation (2)}$$

where "{ }" denotes the extended-binomial-coefficient calculation. If the type field 1008 is "1" indicating two subbands, or two non-special subbands and the special subband, allocated to the mobile station 304, the first bit in the RIF 1002, e.g., bit 10, may be used to distinguish these two cases, and the remaining bits in the RIF 1002, e.g., bit 9, bit 8, . . . , bit 4, may be used to represent the values of u and v. For example, bit 10 in the RIF 1002 being "0" may indicate two subbands are allocated to the mobile station 304, while bit 10 in the RIF 1002 being "1" may indicate two non-special subbands and the special subband are allocated to the mobile station 304. In both cases, the values of bit 9, bit 8, . . . , bit 4 in the RIF 1002 may be determined based on equation (1).

In one exemplary embodiment, values of the RIF 1002 are predetermined based on different combinations of values of u, v, and w. The predetermined values of the RIF 1002 are then stored as a look-up table in the base station 302.

In exemplary embodiments, the LF 1006 may occupy one bit of the resource allocation indicator 1000, e.g., bit 2, and is used to indicate whether the subband having the highest subband index or the subband having the lowest subband index among the subbands allocated to the mobile station 304 is a partially allocated subband for the mobile station 304.

In exemplary embodiments, the PIF 1004 may occupy two bits of the resource allocation indicator 1000, e.g., bit 1 and bit 0, and is used to indicate which RU(s) in the partially allocated subband are allocated to the mobile station 304, by indicating a corresponding resource allocation pattern in the predetermined resource allocation patterns 400.

Figure 11A:
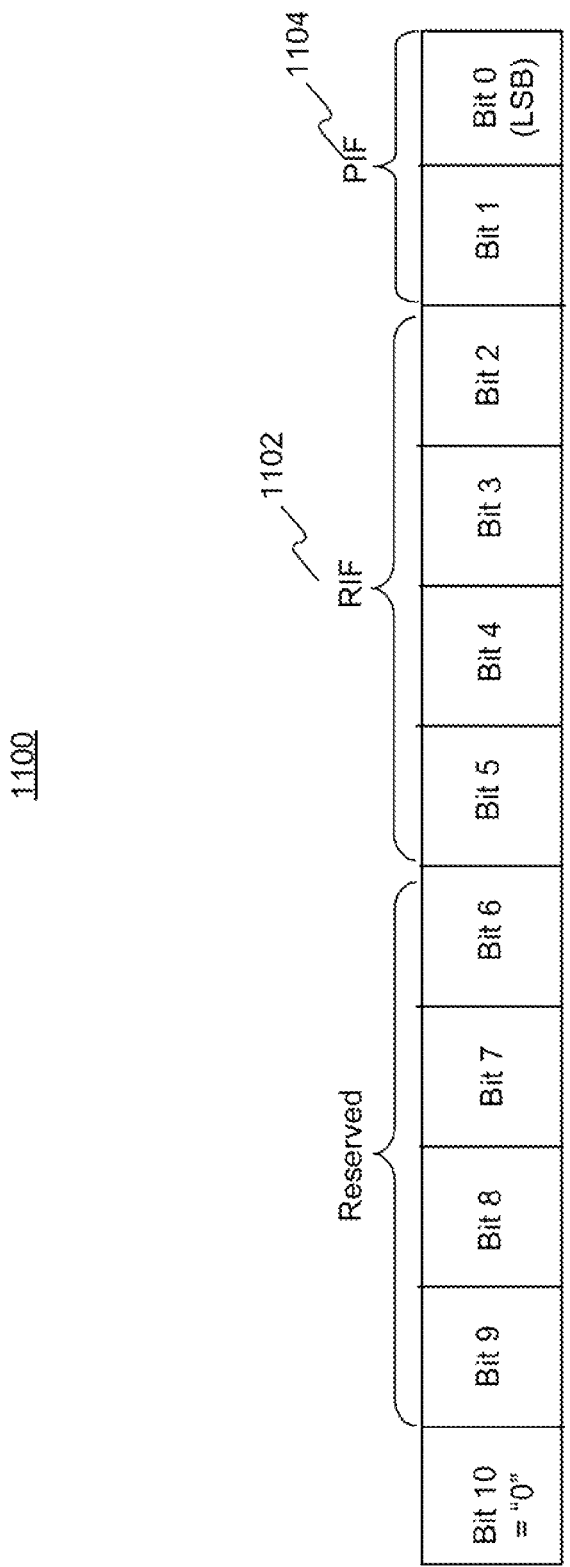
Figure 11B:
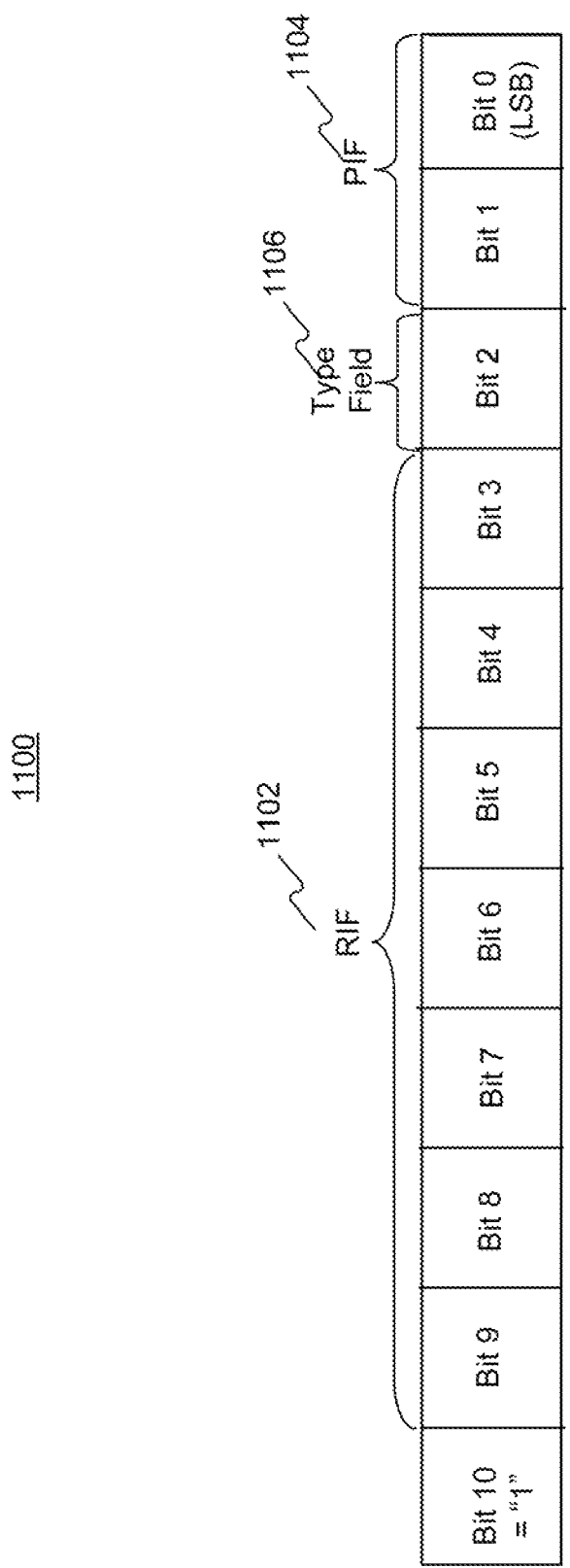

FIGS. 11A and 11B illustrate the resource allocation indicator 1100 for the base station 302 (FIG. 3) to indicate resource allocation to the mobile station 304 (FIG. 3), according to an exemplary embodiment. In the exemplary embodiment, fewer than eleven subbands are available for allocation in the communication system 300. The base station 302 uses the resource allocation indicator 1100 to indicate one subband, subband u, or two subbands, e.g., subbands u and v, or three subbands, e.g., subbands u, v, and w (u, v, and w being subband indexes, u<v<w), including resources allocated to the mobile station 304. The base station 302 generates the resource allocation indicator 1100 based on the predetermined resource allocation patterns 400 (FIG. 4).

Referring to FIGS. 3, 4, 11A, and 11B, in exemplary embodiments, the resource allocation indicator 1100 may have eleven bits, i.e., bit 10, bit 9, . . . bit 0, wherein bit 10 is the MSB and bit 0 is the LSB. The MSB in the resource allocation indicator 1100 may be used to indicate whether one subband, or two or three subbands, are allocated to the mobile station 304. For example, the MSB being "1" may indicate that one subband is allocated to the mobile station 304, and the MSB being "0" may indicate that two or three subbands are allocated to the mobile station 304.

In exemplary embodiments, the resource allocation indicator 1100 includes an RIF 1102 and a PIF 1104. If the MSB is "0" indicating that one subband is allocated to the mobile station 304, as shown in FIG. 11A, the RIF 1102 may occupy four bits of the resource allocation indicator 1100, e.g., bit 5, bit 4, . . . , and bit 2, and is used to indicate which one subband is allocated to the mobile station 304. The PIF 1104 may occupy two bits of the resource allocation indicator 1100, e.g., bit 1 and bit 0, and is used to indicate which RU(s) in the one subband are allocated to the mobile station 304, by indicating a corresponding resource allocation pattern in the predetermined resource allocation patterns 400. Bit 9, bit 8, . . . and bit 6 of the resource allocation indicator 1100 may be reserved. In one exemplary embodiment, the value of the RIF 1102 may be determined as follows:

$$RIF = \begin{Bmatrix} u \\ 1 \end{Bmatrix}, \quad \text{equation (3)}$$

where "{ }" denotes the extended-binomial-coefficient calculation.

If the MSB is "1" indicating that two or three subbands are allocated to the mobile station 304, as shown in FIG. 11B, the RIF 1102 may occupy seven bits of the resource allocation indicator 1100, e.g., bit 9, bit 8, . . . , and bit 3. The PIF 1104 may occupy two bits of the resource allocation indicator 1100, e.g., bit 1 and bit 0. In addition, the resource allocation indicator 1100 may further include a type field 1106. The type field 1106 may occupy one bit of the resource allocation indicator 1000, e.g., bit 2, and is used to indicate whether two or three subbands are allocated to the mobile station 304. The value of the RIF 1102 may be determined based on equation (1) for two subbands, or based on equation (2) for three subbands.

Figure 12:
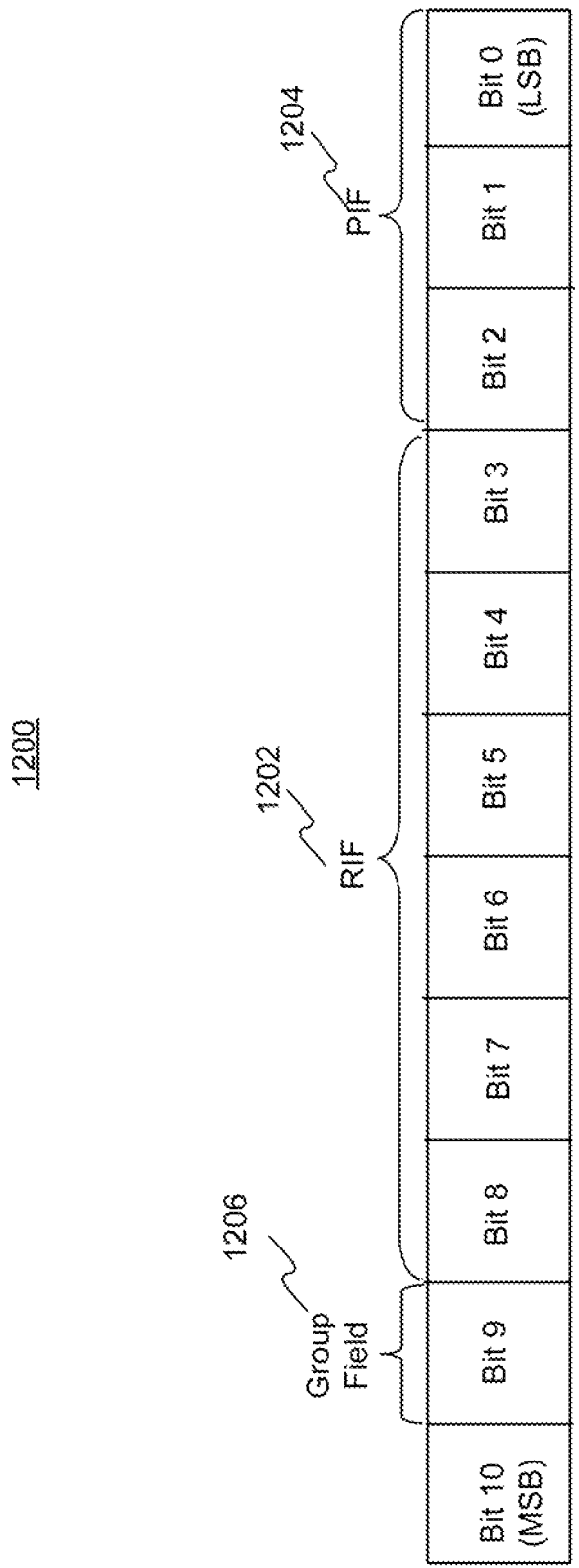

FIG. 12 illustrates the resource allocation indicator 1200 for the base station 302 (FIG. 3) to indicate resource allocation to the mobile station 304 (FIG. 3), according to an exemplary embodiment. In the exemplary embodiment, the communication system 300 (FIG. 3) has a bandwidth of 20 MHz, and more than eleven subbands are available for allocation in the communication system 300. The base station 302 uses the resource allocation indicator 1200 to indicate two subbands, e.g., subbands u and v (u and v being subband indexes, u<v), including resources allocated to the mobile station 304. The base station 302 generates the resource allocation indicator 1200 based on the predetermined resource allocation patterns 500 (FIG. 5). In addition, the base station 302 designates one of the subbands allocated to the mobile station 304 that has the higher subband index, i.e., as a partially allocated subband.

Referring to FIGS. 3, 5, and 12, in exemplary embodiments, the available subbands are subband 20, subband 19, subband 18, . . . , and subband 0. Because a number of the available subbands in the communication system 300, i.e., twenty-one, is larger than a predetermined value, e.g., eleven, the base station 302 may divide the subbands into multiple groups, such as first and second groups.

In one exemplary embodiment, the first group may include ones of the subbands that each have an even index, and the second group may include remaining ones of the subbands that each have an odd index. For example, the first group may include subband 20, subband 18, subband 16, . . . , and subband 0, and the second group may include subband 19, subband 17, subband 15, . . . , and subband 1.

In one exemplary embodiment, the first group may include ones of the subbands that have indexes in the higher half index range, and the second group may include remaining ones of the subbands that have indexes in the lower half index range. For example, the first group may include subband 20, subband 19, subband 18, . . . , and subband 11, and the second group may include subband 10, subband 9, subband 8, . . . , and subband 0. In the exemplary embodiment, because there are a total of twenty-one subbands, the middle subband, i.e., subband 10, may be included in either the first group or the second group.

In one exemplary embodiment, the first group may include eleven of the subbands, and the second group may include remaining ones of the subbands. For example, the first group may include subband 20, subband 19, subband 18, . . . , and subband 10, and the second group may include subband 9, subband 8, . . . , and subband 0.

In exemplary embodiments, the resource allocation indicator 1200 may have eleven bits, i.e., bit 10, bit 9, . . . , and bit 0, wherein bit 10 is the MSB and bit 0 is the LSB. The resource allocation indicator 1200 includes an RIF 1202, a PIF 1204, and a group field 1206.

In exemplary embodiments, the group field 1206 may occupy one bit of the resource allocation indicator 1200, e.g., bit 9, and is used to indicate which group of subbands includes the subband(s) allocated to the mobile station 304. For example, the group field 1206 being "0" indicates that the first group of subbands includes the subband(s) allocated to the mobile station 304, and the group field 1206 being "1" indicates that the second group of subbands includes the subband(s) allocated to the mobile station 304.

In exemplary embodiments, the RIF 1202 may occupy six bits of the resource allocation indicator 1200, e.g., bit 8, bit 7, . . . and bit 3, and is used to indicate which subband(s) in the group indicated by the group field 1206 are allocated to the mobile station 304. A value of the RIF 1202 may be determined based on equation (1).

In exemplary embodiments, the PIF 1204 may occupy three bits of the resource allocation indicator 1200, e.g., bit 2, bit 1, and bit 0, and is used to indicate which RU(s) in the partially allocated subband designated by the base station 302 are allocated to the mobile station 304, by indicating a corresponding resource allocation pattern in the predetermined resource allocation patterns 500.

In exemplary embodiments, one additional bit (not shown), referred to herein as a NumIEs bit may be used together with the MSB in the resource allocation indicator 1200 for indicating that the communication system 300 has a bandwidth of 20 MHz, and more than eleven subbands are available for allocation in the communication system 300. For example, the NumIEs bit and the MSB may both be set to "1" for the indication in partial subband allocation.

Figure 13:
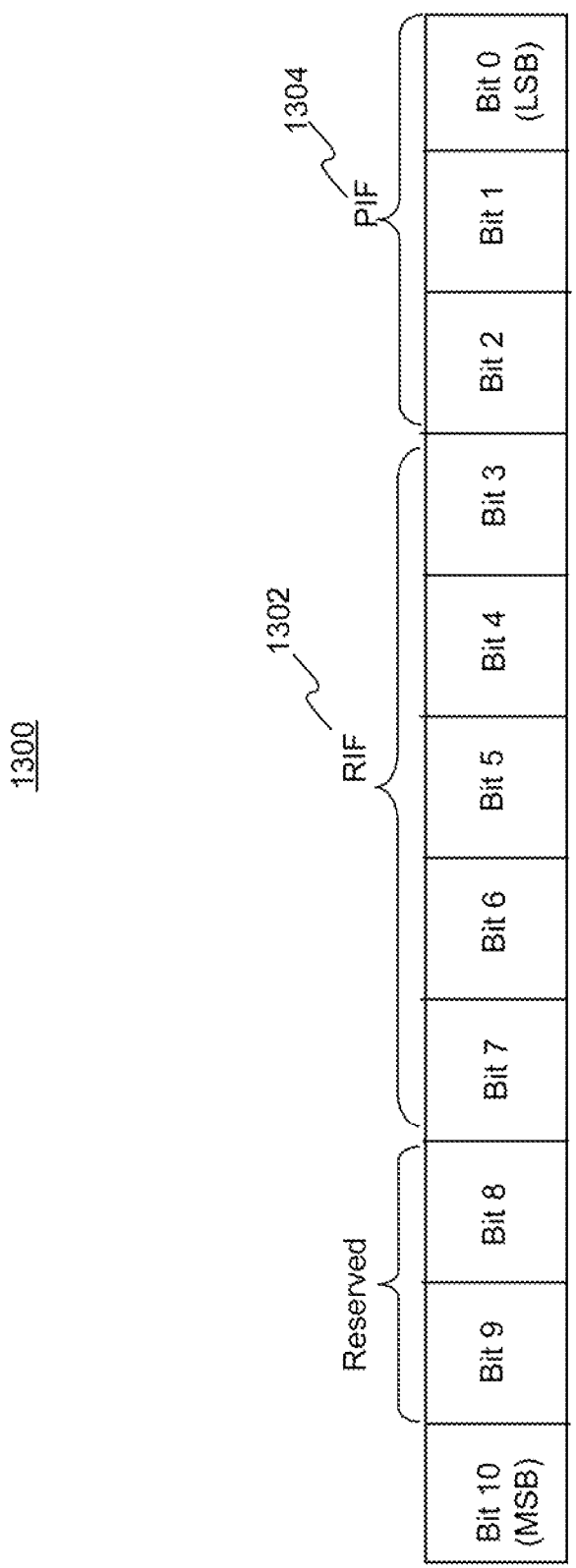

FIG. 13 illustrates the resource allocation indicator 1300 for the base station 302 (FIG. 3) to indicate resource allocation to the mobile station 304 (FIG. 3), according to an exemplary embodiment. In the exemplary embodiment, the communication system 300 (FIG. 3) has a bandwidth of 20 MHz, and more than eleven subbands are available for allocation in the communication system 300. The base station 302 uses the resource allocation indicator 1300 to indicate one subband, e.g., subband u (u being a subband index), including resources allocated to the mobile station 304. The base station 302 generates the resource allocation indicator 1300 based on the predetermined resource allocation patterns 500 (FIG. 5).

Referring to FIGS. 3, 5, and 13, in exemplary embodiments, the resource allocation indicator 1300 may have eleven bits, i.e., bit 10, bit 9, . . . , and bit 0, wherein bit 10 is the MSB and bit 0 is the LSB. The resource allocation indicator 1300 includes an RIF 1302 and a PIF 1304.

In exemplary embodiments, the RIF 1302 may occupy five bits of the resource allocation indicator 1300, e.g., bit 7, bit 6, . . . , and bit 3, and is used to indicate which one subband is allocated to the mobile station 304 as a partially allocated subband. The value of the RIF 1302 may be determined based on equation (3).

In exemplary embodiments, the PIF 1304 may occupy three bits of the resource allocation indicator 1300, e.g., bit 2, bit 1, and bit 0, and is used to indicate which RU(s) in the one subband are allocated to the mobile station 304, by indicating a corresponding resource allocation pattern in the predetermined resource allocation patterns 500. Bit 9 and bit 8 of the resource allocation indicator 1300 may be reserved.

In exemplary embodiments, one additional bit (not shown), referred to herein as a NumIEs bit may be used together with the MSB in the resource allocation indicator 1300 for indicating that the communication system 300 has a bandwidth of 20 MHz, and more than eleven subbands are available for allocation in the communication system 300. For example, the NumIEs bit and the MSB may both be set to "1" for the indication in partial subband allocation.

Figure 14:
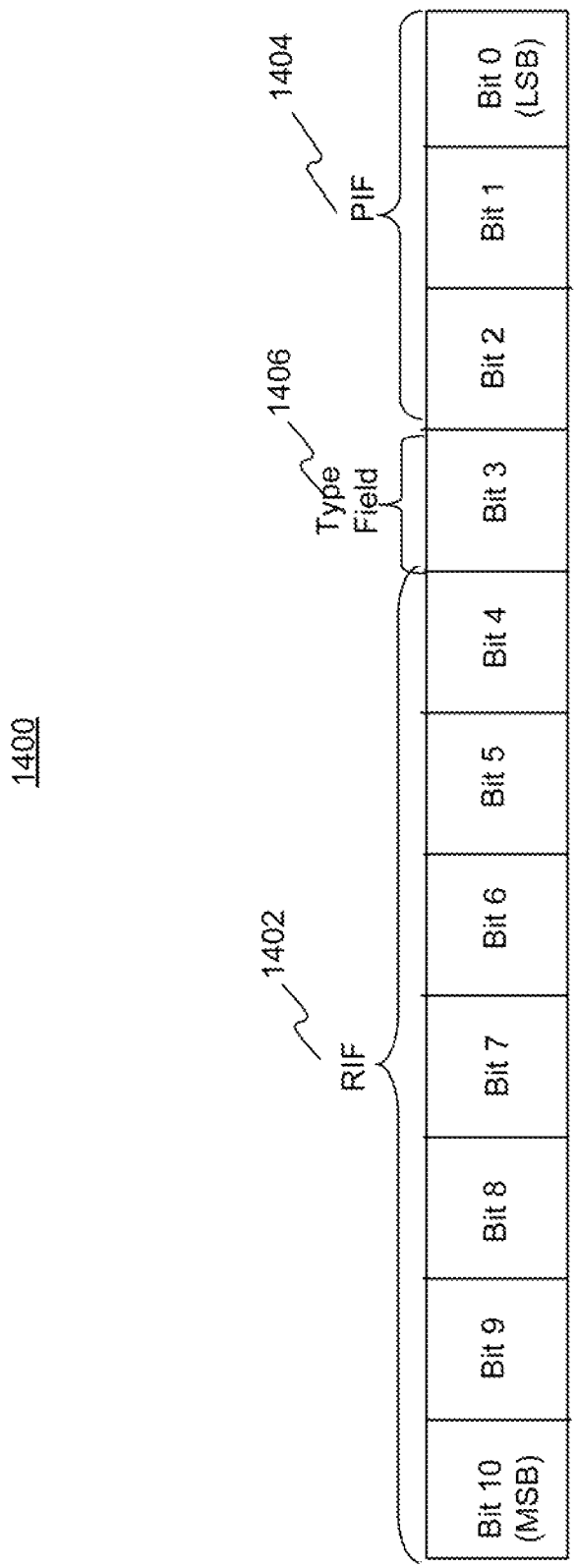

FIG. 14 illustrates the resource allocation indicator 1400 for the base station 302 (FIG. 3) to indicate resource allocation to the mobile station 304 (FIG. 3), according to an exemplary embodiment. In the exemplary embodiment, fewer than twelve subbands are available for allocation in the communication system 300. The base station 302 uses the resource allocation indicator 1400 to indicate two subbands, e.g., subbands u and v, or three subbands, e.g., subbands u, v, and w (u, v, and w being subband indexes, u<v<w), including resources allocated to the mobile station 304. The base station 302 generates the resource allocation indicator 1400 based on the predetermined resource allocation patterns 500 (FIG. 5). In addition, the base station 302 designates one of the subbands allocated to the mobile station 304 that has, e.g., the highest subband index as a partially allocated subband.

Referring to FIGS. 3, 5, and 14, in exemplary embodiments, the resource allocation indicator 1400 may have eleven bits, i.e., bit 10, bit 9, . . . , and bit 0, wherein bit 10 is the MSB and bit 0 is the LSB. The resource allocation indicator 1400 includes an RIF 1402, a PIF 1404, and a type field 1406.

In exemplary embodiments, the type field 1406 may occupy one bit of the resource allocation indicator 1000, e.g., bit 3, and is used to indicate whether two or three non-special subbands are allocated to the mobile station 304. A special subband is defined as the subband that has the highest index among the available subbands in the communication system 300. For example, the type field 1406 being "0" may indicate three non-special subbands, e.g., subbands u, v, and w (subband w being a non-special subband) are allocated to the mobile station 304. Also for example, the type field 1406 being "1" may indicate two subbands, e.g., subbands u and v, or two non-special subbands and the special subband, e.g., subbands u, v, and w (subband w being the special subband), are allocated to the mobile station 304.

In exemplary embodiments, the RIF 1402 may occupy seven bits of the resource allocation indicator 1400, e.g., bit 10, bit 9, . . . bit 4, and is used to indicate which subbands are allocated to the mobile station 304. If the type field 1406 is "0" indicating that three non-special subbands are allocated to the mobile station 304, a value of the RIF 1402 may be determined based on equation (2). If the type field 1408 is "1" indicating that two subbands, or two non-special subbands and the special subband, are allocated to the mobile station 304, the first bit in the RIF 1402, e.g., bit 10, may be used to distinguish these two cases, and the remaining bits in the RIF 1402, e.g., bit 9, bit 8, . . . , bit 4, may be used to represent the values of u and v. For example, bit 10 in the RIF 1402 being "0" may indicate that two subbands are allocated to the mobile station 304, while bit 10 in the RIF 1402 being "1" may indicate that two non-special subbands and the special subband are allocated to the mobile station 304. In both cases, the values of bit 9, bit 8, . . . , bit 4 in the RIF 1402 may be determined based on equation (1).

In exemplary embodiments, the PIF 1404 may occupy three bits of the resource allocation indicator 1400, e.g., bit 2, bit 1, and bit 0, and is used to indicate which RU(s) in the partially allocated subband are allocated to the mobile station 304, by indicating a corresponding resource allocation pattern in the predetermined resource allocation patterns 500.

Figure 15A:
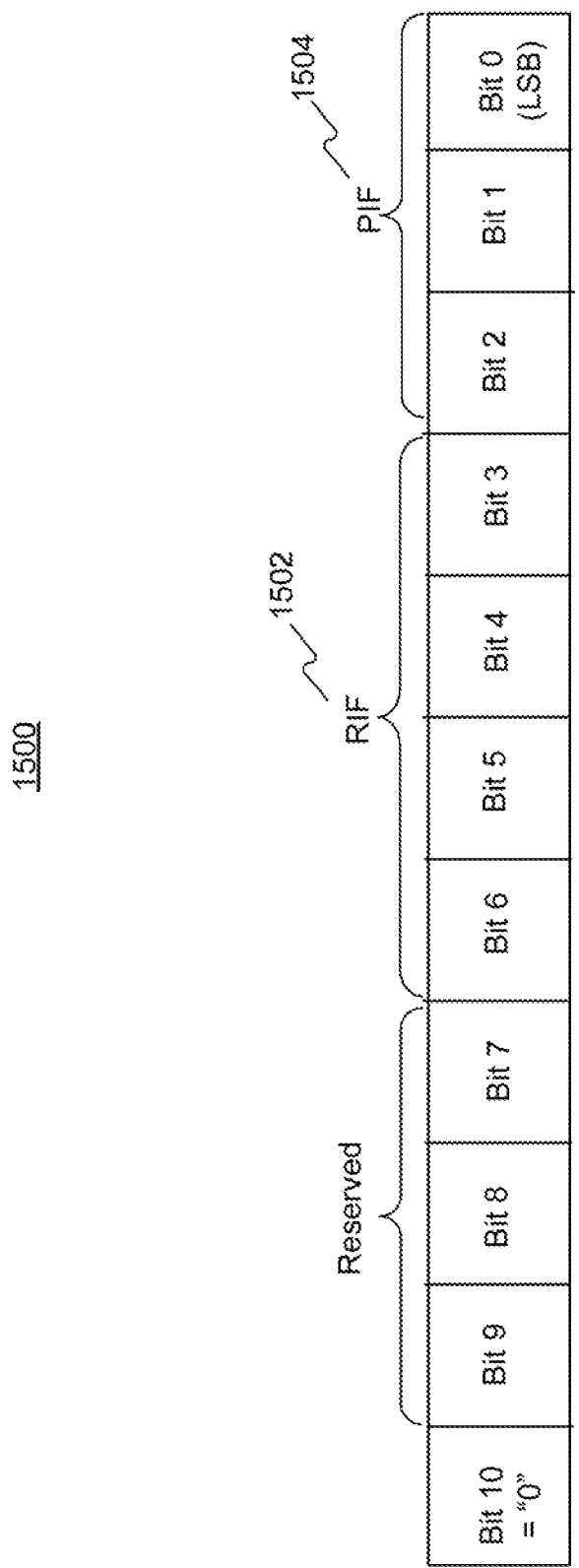
Figure 15B:
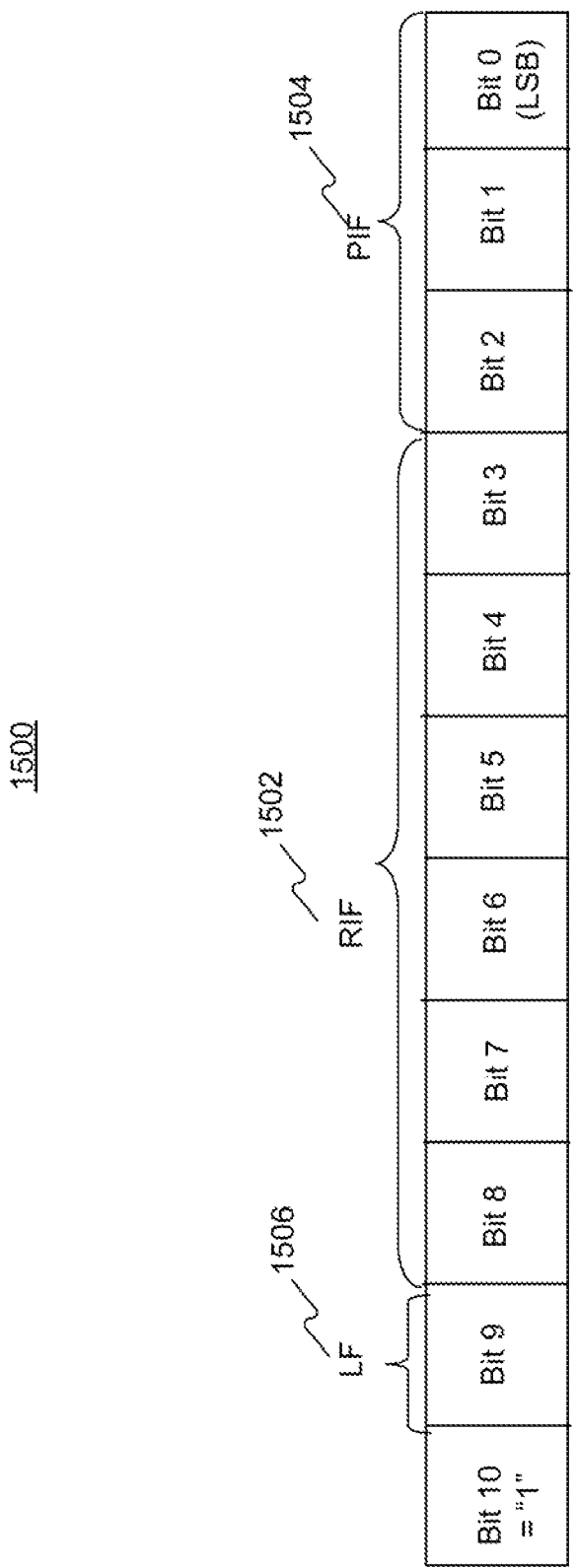

FIGS. 15A and 15B illustrate the resource allocation indicator 1500 for the base station 302 (FIG. 3) to indicate resource allocation to the mobile station 304 (FIG. 3), according to an exemplary embodiment. In the exemplary embodiment, fewer than twelve subbands are available for allocation in the communication system 300. The base station 302 uses the resource allocation indicator 1500 to indicate one subband, e.g., subband u, or two subbands, e.g., subbands u and v (u and v being subband indexes, u<v), including resources allocated to the mobile station 304. The base station 302 generates the resource allocation indicator 1500 based on the predetermined resource allocation patterns 500 (FIG. 5).

Referring to FIGS. 3, 5, 15A, and 15B, in exemplary embodiments, the resource allocation indicator 1500 may have eleven bits, i.e., bit 10, bit 9, . . . , and bit 0, wherein bit 10 is the MSB and bit 0 is the LSB. The MSB in the resource allocation indicator 1500 may be used to indicate whether one subband or two subbands are allocated to the mobile station 304. For example, the MSB being "0" indicates that one subband is allocated to the mobile station 304, and the MSB being "1" indicates that two subbands are allocated to the mobile station 304.

In exemplary embodiments, the resource allocation indicator 1500 includes an RIF 1502 and a PIF 1504. If the MSB is "0" indicating that one subband is allocated to the mobile station 304, as shown in FIG. 15A, the RIF 1502 may occupy four bits of the resource allocation indicator 1500, e.g., bit 6, bit 5, . . . bit 3, and is used to indicate which one subband is allocated to the mobile station 304. The PIF 1504 may occupy three bits of the resource allocation indicator 1500, e.g., bit 2, bit 1, and bit 0, and is used to indicate which RU(s) in the subband are allocated to the mobile station 304, by indicating a corresponding resource allocation pattern in the predetermined resource allocation patterns 500. Bit 9, bit 8, and bit 7 of the resource allocation indicator 1500 may be reserved.

If the MSB is "1" indicating that two subbands, e.g., subbands u and v, are allocated to the mobile station 304, as shown in FIG. 15B, the resource allocation indicator 1500 may further include an LF 1506. The LF 1506 may occupy one bit of the resource allocation indicator 1500, e.g., bit 9, and is used to indicate which one of subbands u and v is a partially allocated subband. For example, the LF 1506 may indicate one of subbands u and v that has the higher subband index, i.e., subband v, as the partially allocated subband. In addition, the RIF 1502 may occupy six bits of the resource allocation indicator 1500, e.g., bit 8, bit 7, . . . , and bit 3, and is used to indicate which subbands are allocated to the mobile station 304. The PIF 1504 may occupy three bits of the resource allocation indicator 1500, e.g., bit 2, bit 1, and bit 0, and is used to indicate which RU(s) in the partially allocated subband are allocated to the mobile station 304, by indicating a corresponding resource allocation pattern in the predetermined resource allocation patterns 500.

Figure 16:
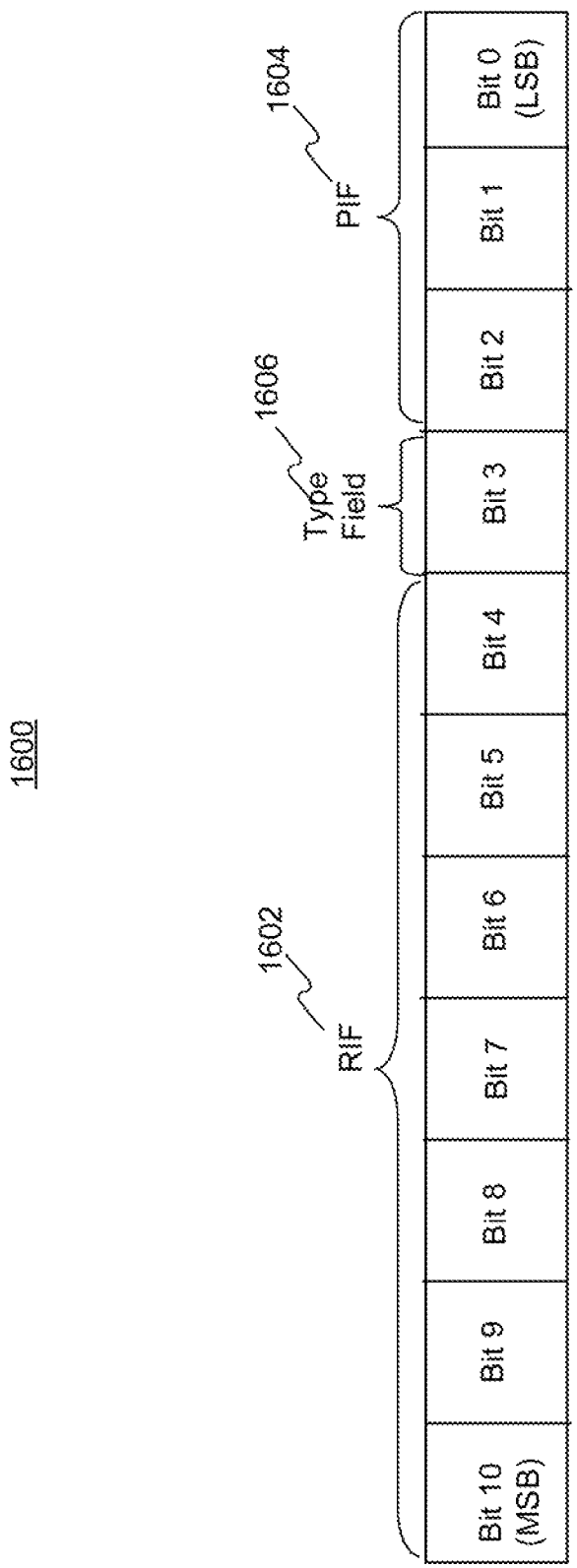

FIG. 16 illustrates the resource allocation indicator 1600 for the base station 302 (FIG. 3) to indicate resource allocation to the mobile station 304 (FIG. 3), according to an exemplary embodiment. In the exemplary embodiment, fewer than eleven subbands are available for allocation in the communication system 300. The base station 302 uses the resource allocation indicator 1600 to indicate two subbands, e.g., subbands u and v, or three subbands, e.g., subbands u, v, and w (u, v, and w being subband indexes, u<v<w), including resources allocated to the mobile station 304. The base station 302 generates the resource allocation indicator 1600 based on the predetermined resource allocation patterns 500 (FIG. 5). In addition, the base station 302 designates one of the subbands allocated to the mobile station 304 that has, e.g., the highest subband index as a partially allocated subband.

Referring to FIGS. 3, 5, and 16, in exemplary embodiments, the resource allocation indicator 1600 may have eleven bits, i.e., bit 10, bit 9, . . . , and bit 0, wherein bit 10 is the MSB and bit 0 is the LSB. The resource allocation indicator 1600 includes an RIF 1602, a PIF 1604, and a type field 1606.

In exemplary embodiments, the type field 1606 may occupy one bit of the resource allocation indicator 1600, e.g., bit 3, and is used to indicate whether two or three subbands are allocated to the mobile station 304. For example, the type field 1606 being "0" indicates that three subbands, e.g., subbands u, v, and w, are allocated to the mobile station 304, and the type field 1606 being "1" indicates that two subbands, e.g., subbands u and v, are allocated to the mobile station 304.

In exemplary embodiments, the RIF 1602 may occupy seven bits of the resource allocation indicator 1600, e.g., bit 10, bit 9, . . . , and bit 4, and is used to indicate which subbands are allocated to the mobile station 304. If the type field 1606 is "0" indicating that three subbands are allocated to the mobile station 304, a value of the RIF 1602 may be determined based on equation (2). If the type field 1606 is "1" indicating that two subbands are allocated to the mobile station 304, the value of the RIF 1602 may be determined based on equation (1).

In exemplary embodiments, the PIF 1604 may occupy three bits of the resource allocation indicator 1600, e.g., bit 2, bit 1, and bit 0, and is used to indicate which RU(s) in the partially allocated subband are allocated to the mobile station 304, by indicating a corresponding resource allocation pattern in the predetermined resource allocation patterns 500.

Figure 17:
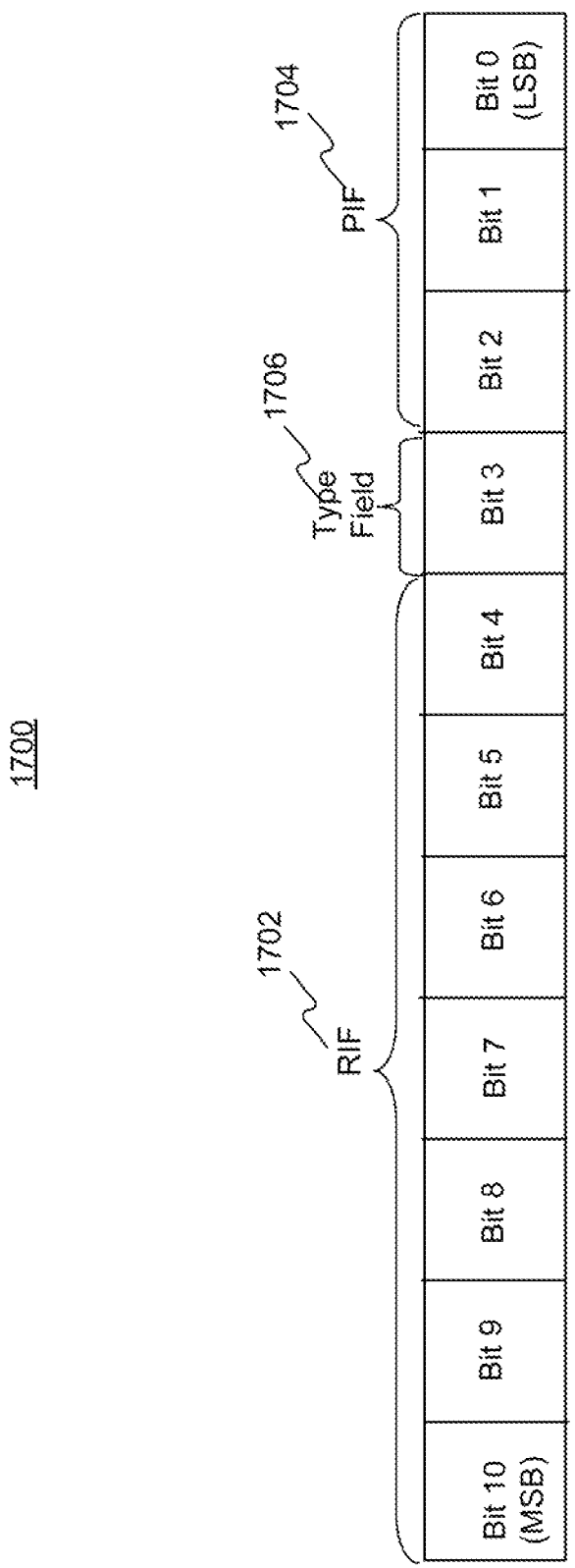

FIG. 17 illustrates the resource allocation indicator 1700 for the base station 302 (FIG. 3) to indicate resource allocation to the mobile station 304 (FIG. 3), according to an exemplary embodiment. In the exemplary embodiment, fewer than eleven subbands are available for allocation in the communication system 300. The base station 302 uses the resource allocation indicator 1700 to indicate one subband, subband u, or two subbands, e.g., subbands u and v, or three subbands, e.g., subbands u, v, and w (u, v, and w being subband indexes, u<v<w), including resources allocated to the mobile station 304. The base station 302 generates the resource allocation indicator 1700 based on the predetermined resource allocation patterns 500 (FIG. 5).

Referring to FIGS. 3, 5, and 17, in exemplary embodiments, the resource allocation indicator 1700 may have eleven bits, i.e., bit 10, bit 9, . . . , and bit 0, wherein bit 10 is the MSB and bit 0 is the LSB. The resource allocation indicator 1700 includes an RIF 1702, a PIF 1704, and a type field 1706.

In exemplary embodiments, the type field 1706 may occupy one bit of the resource allocation indicator 1700, e.g., bit 3, and is used to indicate whether three or fewer than three subbands are allocated to the mobile station 304. For example, the type field 1706 being "0" indicates that three subbands are allocated to the mobile station 304, and the type field 1706 being "1" indicates that one or two subbands are allocated to the mobile station 304.

In exemplary embodiments, if the type field 1706 is "0" indicating that three subbands are allocated to the mobile station 304, the RIF 1702 may occupy seven bits of the resource allocation indicator 1700, e.g., bit 10, bit 9, . . . , bit 4, and is used to indicate which three subbands are allocated to the mobile station 304. The value of the RIF 1702 may be determined based on equation (2). The PIF 1704 may occupy three bits of the resource allocation indicator 1700, e.g., bit 2, bit 1, and bit 0, and is used to indicate which RU(s) in the subband are allocated to the mobile station 304, by indicating a corresponding resource allocation pattern in the predetermined resource allocation patterns 500.

If the type field 1706 is "1" indicating that one subband, e.g., subband u, or two subbands, e.g., subbands u and v (u<v), are allocated to the mobile station 304, the RIF 1702 may occupy seven bits of the resource allocation indicator 1700, e.g., bit 10, bit 9, . . . , bit 4. One bit of RIF 1702 may be used to distinguish these two cases. For example, bit 10 in the RIF 1702 being "0" indicates that two subbands are allocated to mobile station 304, and bit 10 in the RIF 1702 being "1" indicates that one subband is allocated to mobile station 304. The remaining bits in the RIF 1702, e.g., bit 9, bit 8, . . . , bit 4, are used to indicate which subband(s) are allocated to the mobile station 304. The values of bit 9, bit 8, . . . , bit 4 in the RIF 1702 may be determined based on equation (3) for one subband, or based on equation (1) for two subbands.

Figure 18:
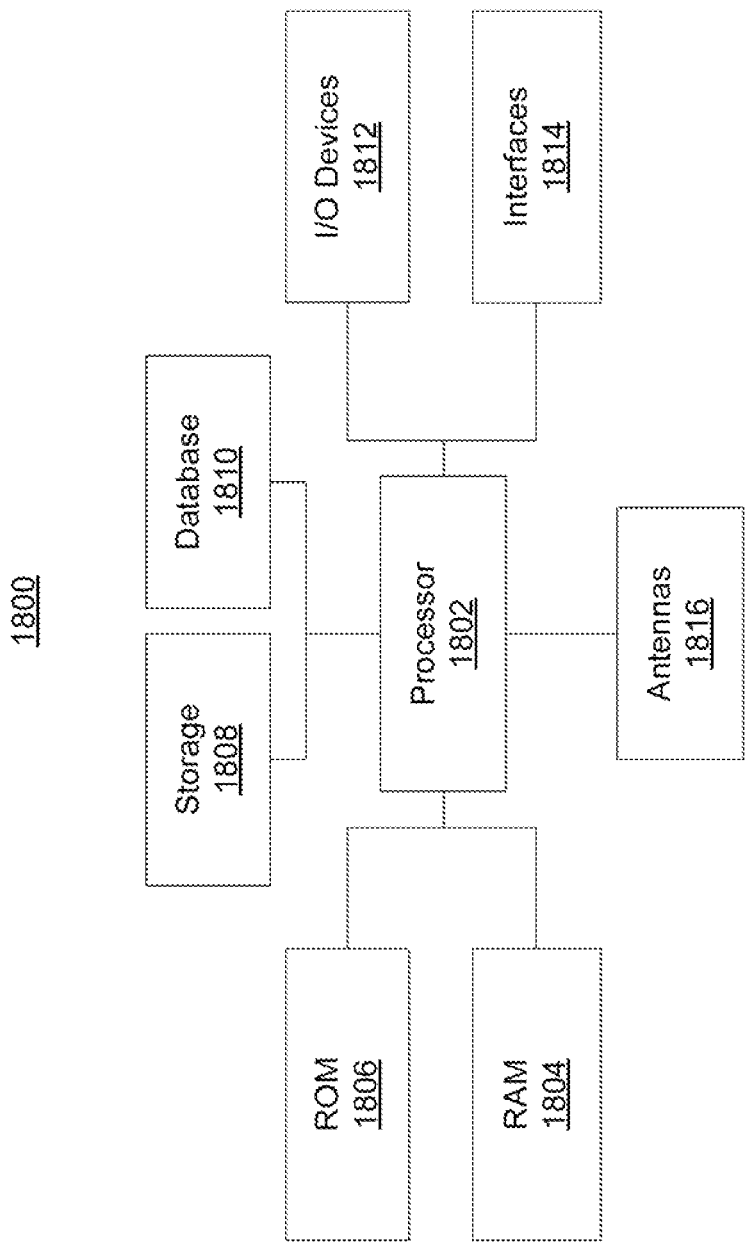
FIG. 18 illustrates a block diagram of a base station, according to an exemplary embodiment.

FIG. 18 illustrates a block diagram of a base station 1800, according to an exemplary embodiment. For example, the base station 1800 may be the base station 302 (FIG. 3). Referring to FIG. 18, the base station 1800 may include one or more of the following components: a processor 1802 configured to execute computer program instructions to perform various processes and methods, random access memory (RAM) 1804 and read only memory (ROM) 1806 configured to access and store information and computer program instructions, storage 1808 to store data and information, databases 1810 to store tables, lists, or other data structures, I/O devices 1812, interfaces 1814, antennas 1816, etc. Each of these components is well-known in the art and will not be discussed further.

In exemplary embodiments, the base station 1800 may allocate resources to a mobile station based on the above-described methods, the resources being included in one or more subbands each including a plurality of RUs. For example, the processor 1802 is configured to provide a plurality of resource allocation patterns each corresponding to a specific RU or a specific combination of RUs in one subband; allocate a part of a first one of the subbands to the mobile station, the part including one or more RUs in the first one of the subbands; and indicate to the mobile station the allocated part of the first one of the subbands by indicating a corresponding resource allocation pattern in the resource allocation patterns.

FIG. 19 illustrates a block diagram of a mobile station 1900, according to an exemplary embodiment. For example, the mobile station 1900 may be the user terminal 304 (FIG. 3). Referring to FIG. 19, the mobile station 1900 may include one or more of the following components: a processor 1902 configured to execute computer program instructions to perform various processes and methods, random access memory (RAM) 1904 and read only memory (ROM) 1906 configured to access and store information and computer program instructions, storage 1908 to store data and information, databases 1910 to store tables, lists, or other data structures, I/O devices 1912, interfaces 1914, antennas 1916, etc. Each of these components is well-known in the art and will not be discussed further.

In exemplary embodiments, the mobile station 1900 may receive resource allocation from a base station based on the above-described methods, the base station providing a plurality of resource allocation patterns each corresponding to a specific RU or a specific combination of RUs in one subband. For example, the processor 1902 is configured to receive a resource allocation indicator from the base station, the resource allocation indicator indicating one or more subbands and one of the resource allocation patterns; and determine, based on the resource allocation indicator, that a part of a first one of the subbands is allocated to the mobile station, the part including one or more RUs in the first one of the subbands.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a base station to allocate resources, corresponding to a frequency band, to a mobile station, the resources being included in one or more subbands of the frequency band each including a plurality of resource units, the method comprising:
   providing a plurality of resource allocation patterns each corresponding to a specific resource unit or a specific combination of resource units in at least one of the subbands;
   allocating a part of a first one of the subbands of the frequency band to the mobile station, the part including one or more resource units in the first one of the subbands; and
   indicating to the mobile station the allocated part of the first one of the subbands by indicating a resource allocation pattern, in the plurality of resource allocation patterns, corresponding to the allocated part of the first one of the subbands.

2. The method of claim 1, wherein the base station allocates the one or more subbands to the mobile station, the method further comprising:
   determining a number of the subbands allocated to the mobile station.

3. The method of claim 1, wherein indicating the resource allocation pattern comprises:
indicating the resource allocation pattern in the plurality of resource allocation patterns, ones of the plurality of resource allocation patterns covering all resource units in a subband without overlapping.

4. The method of claim 1, wherein the first one of the subbands includes first, second, third, and fourth resource units, the indicating of the resource allocation pattern comprising:
indicating the resource allocation pattern corresponding to a specific resource unit or a specific combination of the resource units in the first one of the subbands.

5. The method of claim 4, wherein indicating the resource allocation pattern corresponding to the specific resource unit comprises:
indicating the resource allocation pattern corresponding to the first resource unit.

6. The method of claim 4, wherein indicating the resource allocation pattern corresponding to the specific resource unit comprises:
indicating the resource allocation pattern corresponding to the second resource unit.

7. The method of claim 4, wherein indicating the resource allocation pattern corresponding to the specific resource unit comprises:
indicating the resource allocation pattern corresponding to the third resource unit.

8. The method of claim 4, wherein indicating the resource allocation pattern corresponding to the specific resource unit comprises:
indicating the resource allocation pattern corresponding to the fourth resource unit.

9. The method of claim 4, wherein indicating the resource allocation pattern corresponding to the specific combination of resource units comprises:
indicating the resource allocation pattern corresponding to the first and second resource units.

10. The method of claim 4, wherein indicating the resource allocation pattern corresponding to the specific combination of resource units comprises:
indicating the resource allocation pattern corresponding to the first and third resource units.

11. The method of claim 4, wherein indicating the resource allocation pattern corresponding to the specific combination of resource units comprises:
indicating the resource allocation pattern corresponding to the first and fourth resource units.

12. The method of claim 4, wherein indicating the resource allocation pattern corresponding to the specific combination of resource units comprises:
indicating the resource allocation pattern corresponding to the second and third resource units.

13. The method of claim 4, wherein indicating the resource allocation pattern corresponding to the specific combination of resource units comprises:
indicating the resource allocation pattern corresponding to the second and fourth resource units.

14. The method of claim 4, wherein indicating the resource allocation pattern corresponding to the specific combination of resource units comprises:
indicating the resource allocation pattern corresponding to the third and fourth resource units.

15. The method of claim 4, wherein indicating the resource allocation pattern corresponding to the specific combination of resource units comprises:
indicating the resource allocation pattern corresponding to the first, second, and third resource units.

16. The method of claim 4, wherein indicating the resource allocation pattern corresponding to the specific combination of resource units comprises:
indicating the resource allocation pattern corresponding to the first, second, and fourth resource units.

17. The method of claim 4, wherein indicating the resource allocation pattern corresponding to the specific combination of resource units comprises:
indicating the resource allocation pattern corresponding to the first, third, and fourth resource units.

18. The method of claim 4, wherein indicating the resource allocation pattern corresponding to the specific combination of resource units comprises:
indicating the resource allocation pattern corresponding to the second, third, and fourth resource units.

19. The method of claim 1, wherein the indicating comprises:
generating a resource allocation indicator having a plurality of bits, the resource allocation indicator including a pattern indication field to indicate the resource allocation pattern; and
transmitting the resource allocation indicator to the mobile station.

20. The method of claim 19, wherein the generating includes generating the resource allocation indicator to include the pattern indication field occupying two bits of the indicator.

21. The method of claim 19, wherein the generating includes generating the resource allocation indicator to include the pattern indication field occupying three bits of the indicator.

22. The method of claim 1, further comprising:
allocating all resource units in a second one of the subbands to the mobile station; and
indicating to the mobile station the first and second ones of the subbands.

23. The method of claim 22, wherein indicating the first and second ones of the subbands comprises:
generating a resource allocation indicator having a plurality of bits, the resource allocation indicator including a resource indexing field to indicate that the first and second ones of the subbands are allocated to the mobile station; and
transmitting the resource allocation indicator to the mobile station.

24. The method of claim 23, wherein the generating includes generating the resource allocation indicator to include the resource indexing field occupying seven bits in the resource allocation indicator.

25. The method of claim 23, wherein the generating includes generating the resource allocation indicator to include one bit to indicate which one of the first and second ones of the subbands is a partially allocated subband.

26. The method of claim 23, wherein the generating includes generating the resource allocation indicator to include one bit to indicate that one of the first and second ones of the subbands that has a higher subband index is a partially allocated subband.

27. The method of claim 23, wherein the generating comprises:
performing an extended-binomial-coefficient calculation on indexes of the first and second ones of the subbands; and
determining a value for the resource indexing field based on the calculation.

28. A base station to allocate resources, corresponding to a frequency band, to a mobile station, the resources being included in one or more subbands of the frequency band each including a plurality of resource units, the base station comprising:

a processor; and
a memory for storing instructions executable by the processor,
the processor being configured to:
provide a plurality of resource allocation patterns each corresponding to a specific resource unit or a specific combination of resource units in at least one of the subbands;
allocate a part of a first one of the subbands of the frequency band to the mobile station, the part including one or more resource units in the first one of the subbands; and
indicate to the mobile station the allocated part of the first one of the subbands by indicating a resource allocation pattern, in the plurality of resource allocation patterns, corresponding to the allocated part of the first one of the subbands.

29. The base station of claim 28, wherein the base station allocates the one or more subbands to the mobile station, the processor being further configured to:
determine a number of the subbands allocated to the mobile station.

30. The base station of claim 28, wherein the processor is further configured to:
indicate the resource allocation pattern in the plurality of resource allocation patterns, ones in the plurality of resource allocation patterns covering all resource units in a subband without overlapping.

31. The base station of claim 28, wherein the first one of the subbands includes first, second, third, and fourth resource units, the processor being further configured to:
indicate the resource allocation pattern corresponding to a specific resource unit or a specific combination of the resource units in the first one of the subbands.

32. A method for a mobile station to receive resource allocation from a base station, the base station providing a plurality of resource allocation patterns each corresponding to a specific resource unit or a specific combination of resource units in a subband of a frequency band, the method comprising:
receiving a resource allocation indicator from the base station, the resource allocation indicator indicating one or more subbands of the frequency band and one of the resource allocation patterns; and
determining, based on the resource allocation indicator, that a part of a first one of the subbands of the frequency band is allocated to the mobile station, the part including one or more resource units in the first one of the subbands.

33. The method of claim 32, wherein the receiving comprises:
receiving the resource allocation indicator including a pattern indication field to indicate the one of the resource allocation patterns.

34. The method of claim 32, wherein the receiving comprises:
receiving the resource allocation indicator including two bits to indicate the one of the resource allocation patterns.

35. The method of claim 32, wherein the receiving comprises:
receiving the resource allocation indicator including three bits to indicate the one of the resource allocation patterns.

36. The method of claim 32, further comprising:
determining, based on the resource allocation indicator, that all resource units in a second one of the subbands are allocated to the mobile station.

37. The method of claim 36, wherein the receiving comprises:
receiving the resource allocation indicator including a resource indexing field to indicate that the first and second ones of the subbands are allocated to the mobile station.

38. The method of claim 36, wherein the receiving comprises:
receiving the resource allocation indicator including seven bits to indicate that the first and second ones of the subbands are allocated to the mobile station.

39. A mobile station to receive resource allocation from a base station, the base station providing a plurality of resource allocation patterns each corresponding to a specific resource unit or a specific combination of resource units in a subband of a frequency band, the mobile station comprising:
a processor; and
a memory for storing instructions executable by the processor, the processor being configured to:
receive a resource allocation indicator from the base station, the resource allocation indicator indicating one or more subbands of the frequency band and one of the resource allocation patterns; and
determine, based on the resource allocation indicator, that a part of a first one of the subbands of the frequency band is allocated to the mobile station, the part including one or more resource units in the first one of the subbands.

* * * * *